US012257734B2

(12) United States Patent
Guibergia et al.

(10) Patent No.: US 12,257,734 B2
(45) Date of Patent: Mar. 25, 2025

(54) WORKPIECE CUTTING EQUIPMENT HANGING OVER THE TOP OF WORKPIECES

(71) Applicant: Real Performance Machinery, LLC, Summerville, SC (US)

(72) Inventors: Shawn J Guibergia, Summerville, SC (US); Nicholas J Thuemler, Corning, CA (US)

(*) Notice: Subject to any disclaimer, the term of this patent is extended or adjusted under 35 U.S.C. 154(b) by 0 days.

(21) Appl. No.: 17/129,605

(22) Filed: Dec. 21, 2020

(65) Prior Publication Data

US 2021/0187779 A1 Jun. 24, 2021

Related U.S. Application Data

(60) Provisional application No. 62/951,409, filed on Dec. 20, 2019.

(51) Int. Cl.

*B27B 3/30* (2006.01)
*B27B 1/00* (2006.01)
*B27B 7/04* (2006.01)
*B27B 25/02* (2006.01)

(52) U.S. Cl.

CPC ................ *B27B 3/30* (2013.01); *B27B 1/007* (2013.01); *B27B 7/04* (2013.01); *B27B 25/02* (2013.01)

(58) Field of Classification Search

CPC .. B27B 3/30; B27B 1/007; B27B 7/04; B27B 25/02; G05B 19/19; Y10T 83/155; Y10T 83/6588; Y10T 83/178; Y10T 83/538; Y10T 83/7876

USPC ........................................................... 83/401

See application file for complete search history.

(56) References Cited

U.S. PATENT DOCUMENTS 2,987,085 A * 6/1961 Porter .................... B23D 47/04 83/100
3,747,457 A * 7/1973 Thompson ................ B27B 7/02 83/477.1
4,289,180 A * 9/1981 Weinzierl ................ B27B 29/00 198/414
4,676,130 A * 6/1987 Nutt ........................ B27B 31/06 83/155
5,142,955 A * 9/1992 Hale ........................ B27B 5/228 83/368
5,213,022 A * 5/1993 Elgan ...................... B23D 53/04 83/803
5,287,782 A * 2/1994 Scott ....................... B23Q 3/002 83/450
5,396,938 A * 3/1995 Cannaday ................. B27B 5/34 144/116
5,400,842 A * 3/1995 Brisson ................... B27B 1/007 144/242.1
5,435,361 A * 7/1995 Knerr ...................... B27B 1/007 144/248.6
5,722,474 A * 3/1998 Raybon ................... B27B 31/06 144/250.23
5,946,995 A * 9/1999 Michell ................... B27B 33/20 83/485

(Continued)

FOREIGN PATENT DOCUMENTS

ES 2382858 A1 * 6/2012 ........... B23D 59/006
FR 2659590 A1 * 2/1990 ............. B27B 25/04

*Primary Examiner* — Laura M Lee

(57) ABSTRACT

Wood cutting and chipping equipment having saws and chippers mounted to an overhead support structure.

10 Claims, 43 Drawing Sheets

(56) References Cited

U.S. PATENT DOCUMENTS

| | | | | |
|---|---|---|---|---|
| 6,494,240 | B1 * | 12/2002 | Brisson | B27B 25/02 144/242.1 |
| 6,923,101 | B2 * | 8/2005 | Culpepper | B23D 45/20 83/287 |
| 7,013,779 | B2 * | 3/2006 | McGehee | B27B 5/36 83/497 |
| 7,117,907 | B2 * | 10/2006 | Mitchell | B27L 11/007 144/1.1 |
| 7,861,754 | B2 * | 1/2011 | Mitchell | B27B 7/04 83/508.3 |
| 11,772,294 | B2 * | 10/2023 | Bullion | B27B 7/04 83/488 |
| 2004/0261590 | A1 * | 12/2004 | Conry | B27B 7/04 144/357 |
| 2010/0031792 | A1 * | 2/2010 | McGehee | B27B 7/04 83/477.1 |
| 2013/0032017 | A1 * | 2/2013 | Stocke | B27B 5/34 83/665 |
| 2015/0352743 | A1 | 12/2015 | McGehee | |
| 2019/0308261 | A1 * | 10/2019 | Myrfield, Jr. | B23Q 15/013 |

* cited by examiner

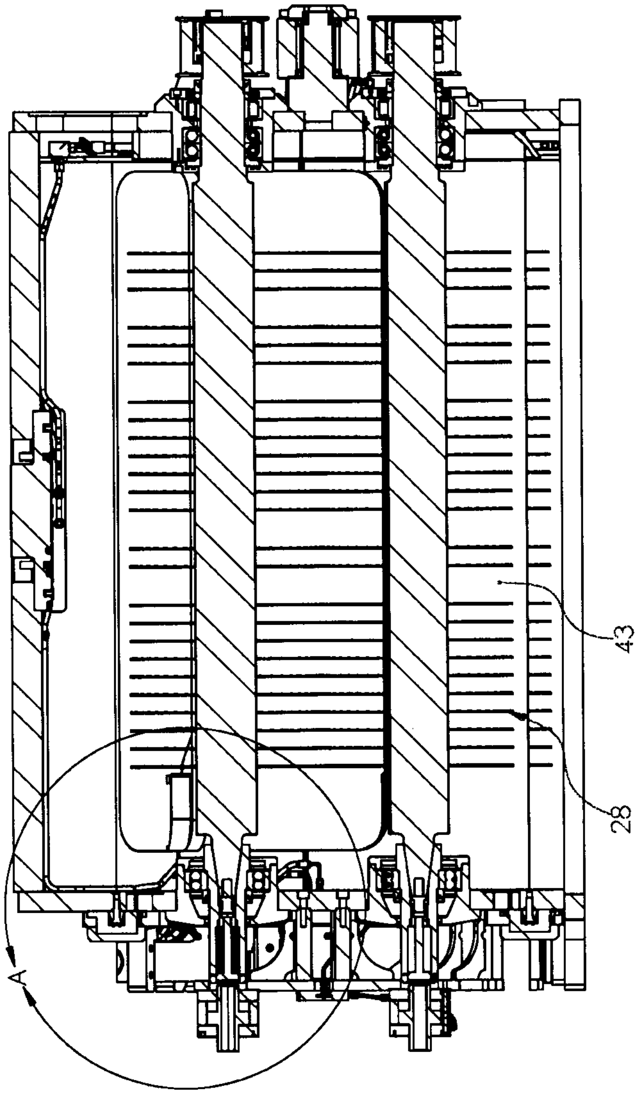
FIG 6
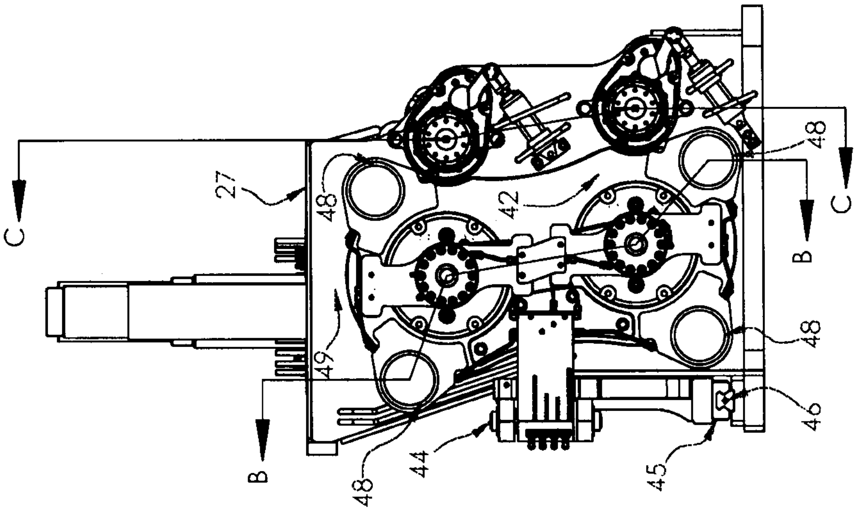

FIG 40

HOTT (HANGING-OVER-THE-TOP) TECHNOLOGY

- No support structure below Sawbox provides a direct path for chips/sawdust to waste conveyors and eliminates areas for debris to build up
- Top mounted linear guideways are easy to maintain
- Designed without chip heads in Sawbox, allowing feed rolls to be close to saws and allow reliable processing of shorter cants
- Arbor motors, mounted flat on top of Sawbox and not on their sides allows for easy motor service and replacement
- Easily adjustable tensioners on poly chain belts that drive the arbors ensures proper tension is maintained on these belts
- Single motor design reduces the number of poly chain belts and sprockets and eliminates jack-shafts and their bearings
- Reduced inertia for skewing, due to motor mass being tight to skew pivot axis, allowing for faster more precise sets

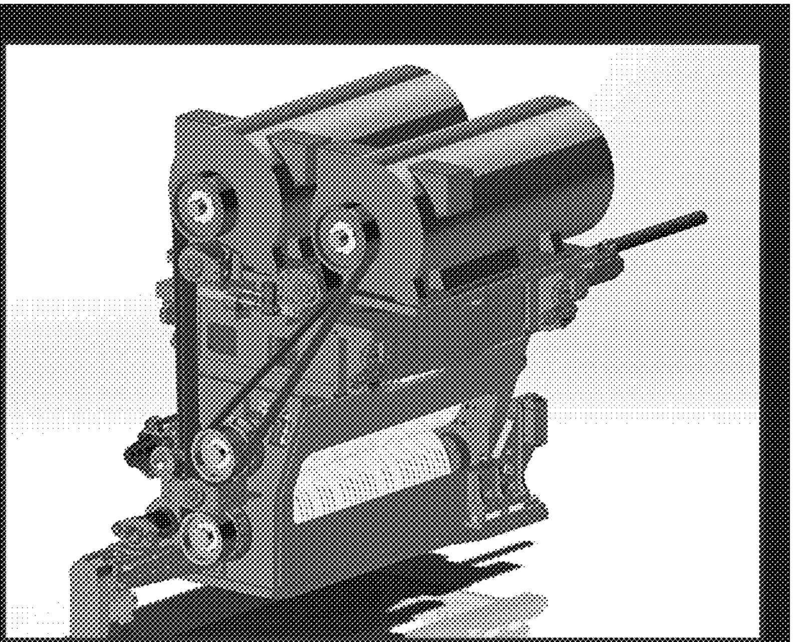

WORKPIECE CUTTING EQUIPMENT HANGING OVER THE TOP OF WORKPIECES

CROSS-REFERENCE TO RELATED APPLICATIONS

USPTO Provisional Patent Application No. 62/951,409

STATEMENT REGARDING FEDERALLY SPONSORED RESEARCH OR DEVELOPMENT

Not Applicable

FIELD OF THE INVENTION

The present invention generally relates to machines and processes for cutting logs into lumber or timber.

BACKGROUND OF THE INVENTION

Conventional machines and processes for cutting logs into lumber or timber present many inefficiencies, performance limitations, and maintenance issues. Novel machines and processes for cutting logs into lumber or timber are commercially needed. The present invention presents many advantages over existing machines and processes.

SUMMARY OF THE INVENTION

The present invention includes many aspects and features.

According to at least one other aspect of the invention, in accordance with at least one embodiment thereof, is provided an infeed portion, a curve chipping and profiling portion, a curve sawing gang portion and an outfeed portion arranged in series thereof for managing, transporting and processing a cant, or already minimally processed tree or log into lumber, or boards.

The workpiece processing equipment hanging over the top of the workpieces consists of a support frame with guide rails and bearings and a means of motion and constrains, mounted above the workpieces being processed. The profiling curve sawing gang hanging over the top of workpieces uses an overhead support structure which the processing equipment, meaning the cutting tools and or saws, are mounted to. The processing equipment is mounted to linear guide rails which allows the equipment to translate in a direction perpendicular to the flow of the workpieces. The path at which the equipment follows is determined by a 3D scanner and optimizer that decides what the workpiece or cant, will be processed into. The scanner can see the geometric shape of the cant, including its curvature and the optimizer calculates the most valuable solution including the curvature path of the cant. The processing equipment can then follow the curvature path of the cants, yielding the highest recovery of the cant fiber.

The profiling curve sawing gang hanging over the top of the workpiece has an improved canting and profiling method over the existing methods. The canter consists of two heads that rotate opposite of each other and are arranged with one head above the other and offset to allow an overlap, without hitting each other. This allows for a simple drive method using drive lines and belts. The overlap, or match line of the canter heads is adjustable, and raises or lowers depending on the cant thickness being processed to equalize the cutting forces. The profiling heads and also driveshaft driven and are vertically adjustable depending on the provided optimizer solution. This assembly is mounted on an overhead support structure.

The profiling curve sawing gang has an improved method of curve sawing cants over the existing methods. The curve sawing gang assembly is mounted to an overhead structure on linear rails and bearings that allow the assembly to move perpendicular to the flow of the workpieces. The curve sawing gang saw box is much smaller in size and mass than all other machines in the past. All of the mass is very close to the saw box pivot, allowing the machine to make more accurate sets and in less time. The saw box uses all electric actuation which would not be possible if the machine what mounted below the workpieces due the simple fact that contamination is an issue with electric actuators. The electric actuators are mounted above the cutting tools, keeping them out of harms way. The pivot of the curve sawing gang is mounted on the carriage that translates the saw box perpendicular to the flow. This is the opposite of all other machines. This allows the saws to have a more predictable path, since they travel in only one direction during an angled translation move.

The curve sawing gang assembly has an improved saw guide clamping system. This system uses hollow shaft hydraulic cylinders to clamp the guides. This allows for the clamping component to be perfectly concentric with the guide clamping face. Having one large clamping face eliminate the problems of the prior method which uses a three-pusher setup that is known to clamp the guide stack out of square, making poor lumber and burning up saws.

The curve sawing gang assembly also has an automatic locking and unlocking arbor door for saw access and saw changes. This is done through spring engaged, hydraulic release actuators for the door, and the arbor tapered nose cone.

BRIEF DESCRIPTION OF THE DRAWINGS

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 6 is an elevation side view of the curve sawing gang saw box with a section view about the “B” section line.

FIGS. 9-43 are various embodiments of the invention.

DETAILED DESCRIPTION AND BEST MODE OF IMPLEMENTATION

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

Figure 1:
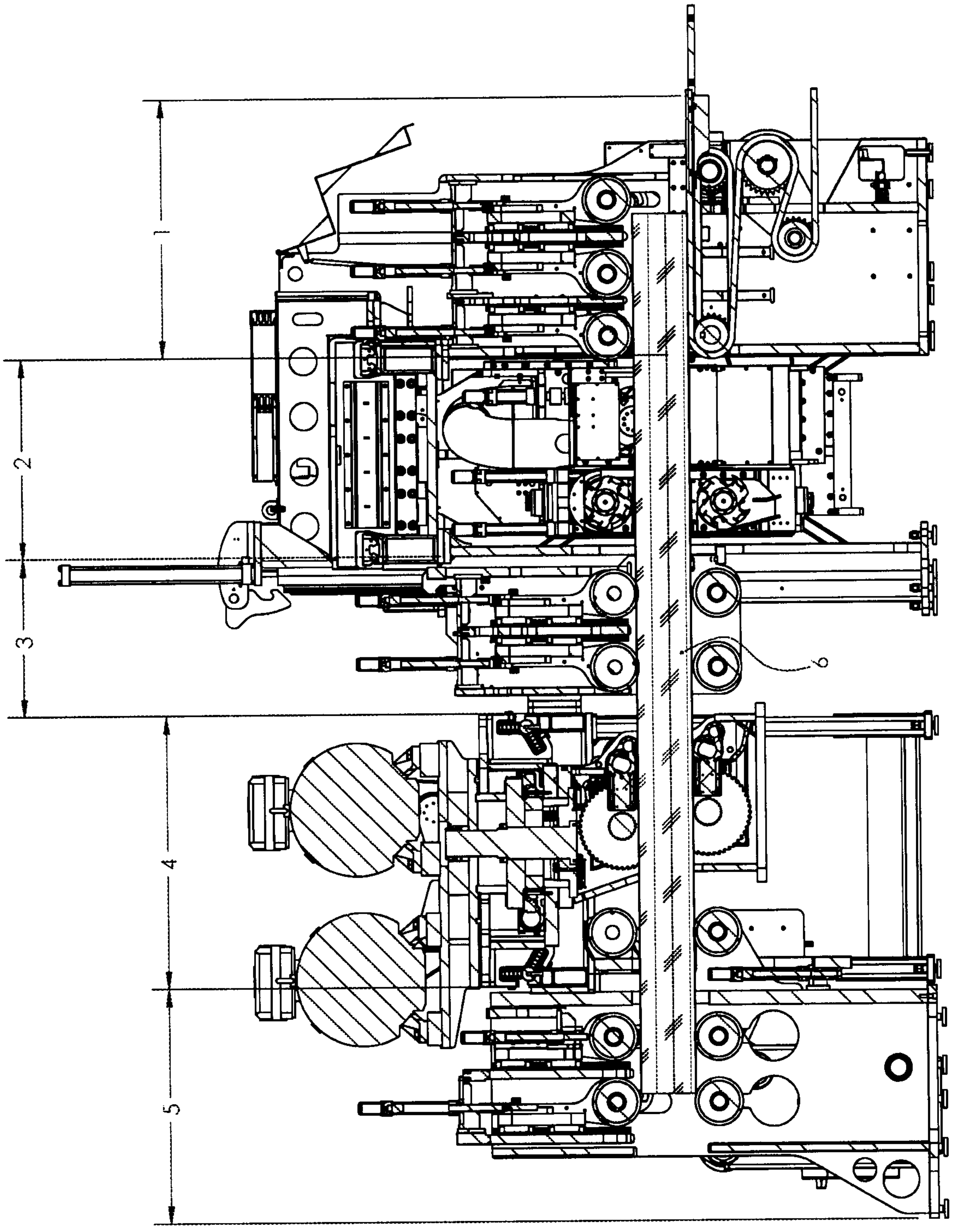
FIG. 1 is an elevation section view of the overall Profiling Curve Sawing Gang hanging over the top of the workpiece, with flow showing from right to left. The section is taken about the centerline of the workpiece feed.

Referring to FIG. 1, the preferred embodiment for Workpiece processing equipment hanging over the top of a workpiece is shown in the form of a profiling curve sawing gang. The profiling Curve sawing gang consists of an Infeed module 1, canter/profiler module 2 hanging over the top of a workpiece 6, mid-feed module 3, curve sawing gang 4 hanging over the top of a workpiece 6, and an outfeed module 5.

Figure 2:
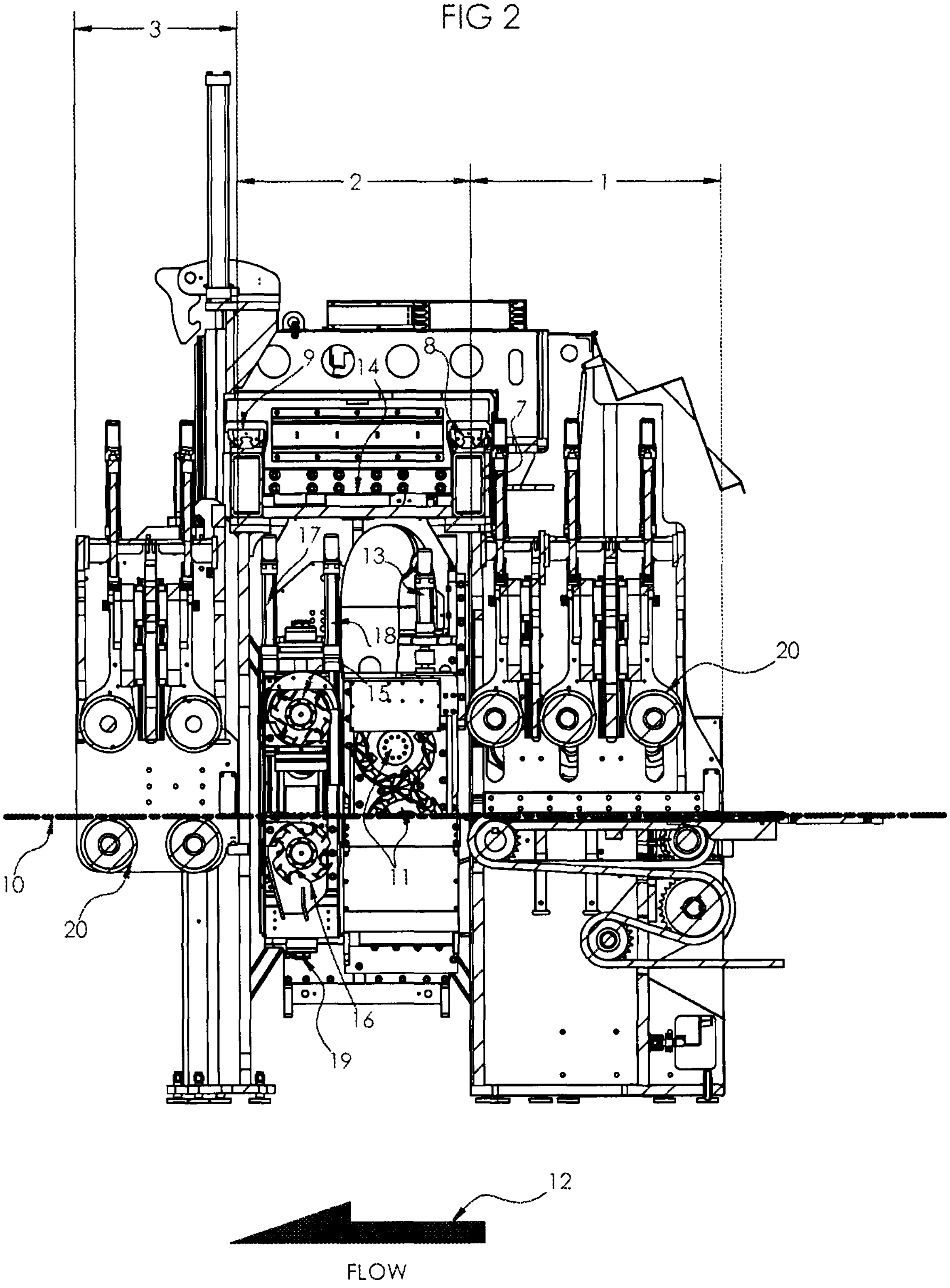
FIG. 2 is an elevation section view of the infeed and canter/profiler module and a mid-feed module, with flow showing from right to left. The section is taken at the centerline of the workpiece feed.

Looking now at FIG. 1 and FIG. 2, the canter/profiler module 2 is mounted to an overhead support structure 7 by way of linear rails 8, and linear bearings 9. Overhead support structure 7, linear rails 8 and linear bearings 9 are all mounted above the workpiece feedline 10. The linear rails 8 and linear bearings 9 allow the canter/profiler module 2 to move linearly, perpendicular to the direction of flow 12. The canter/profiler module contains a pivot 14 which allows the canter/profiler to pivot around the curvature of the cant. The canter heads 11 are configured one over the top of the other and offset in the direction of flow 12 to allow the heads to overlap without interference and are counter rotating in relation to each other. The canter heads 11 have a canter lift cylinder 13 which moves the canter heads 11 match line to always be in the middle of the cant thickness, equalizing the cutting forces. The top profiling head 15 and bottom profiling head 16 are placed immediately downstream of the canter heads 11. The top profiling head 15 has a top profiling head positioning cylinder 17 to allow the top profiling head 15 to adjust to different positions depending on the optimizer solution. The bottom profiling head 16 has a bottom profiling head positioning cylinder 18 to allow the bottom profiling head 16 to adjust to different positions depending on the optimizer solution. The top profiling head 15 and bottom profiling head 16 pivot with the canter heads 11 on the same pivot 14, and have an additional profiler pivot 19 that allows the profiling heads to pivot slightly off of the main pivot 14 to allow the profiling heads to match the curvature of the cants. The workpiece 6 is driven and maintained by powered feed rolls 20 mounted in the infeed module 1 and mid-feed module 3.

Figure 4:
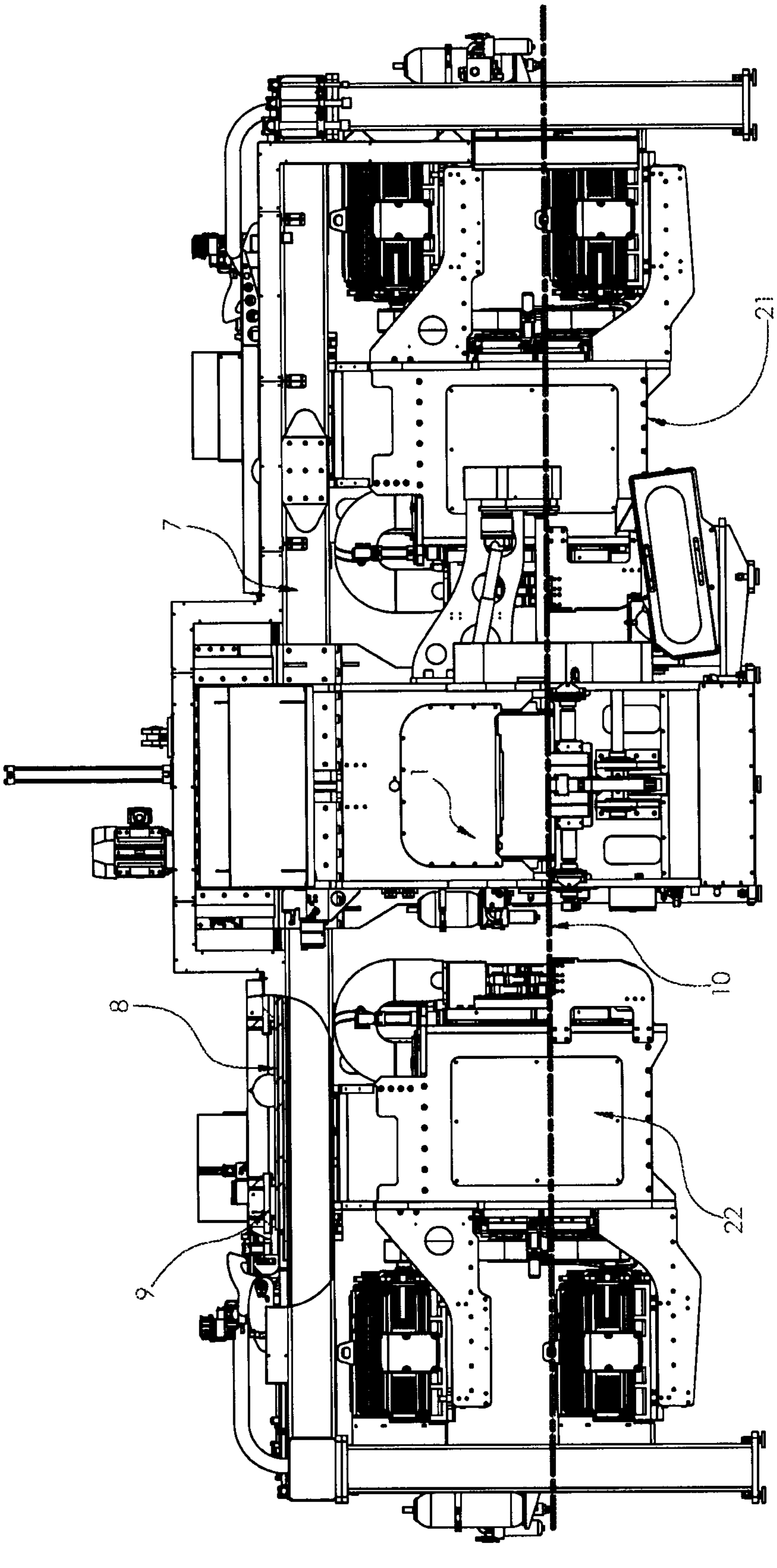
FIG. 4 is an elevation view of the canter profiler module and infeed module looking with the direction of flow.

Looking now to FIG. 2 and FIG. 4, there is a right-hand canter/profiler module 21 and a left-hand canter/profiler module 22, both mounted on the same overhead support structure 7, which is supported by the infeed module 1 and mid-feed module 3. The overhead support structure 7, linear rails 8 and linear bearings 9 are all mount above the workpiece feedline 10.

Figure 3:
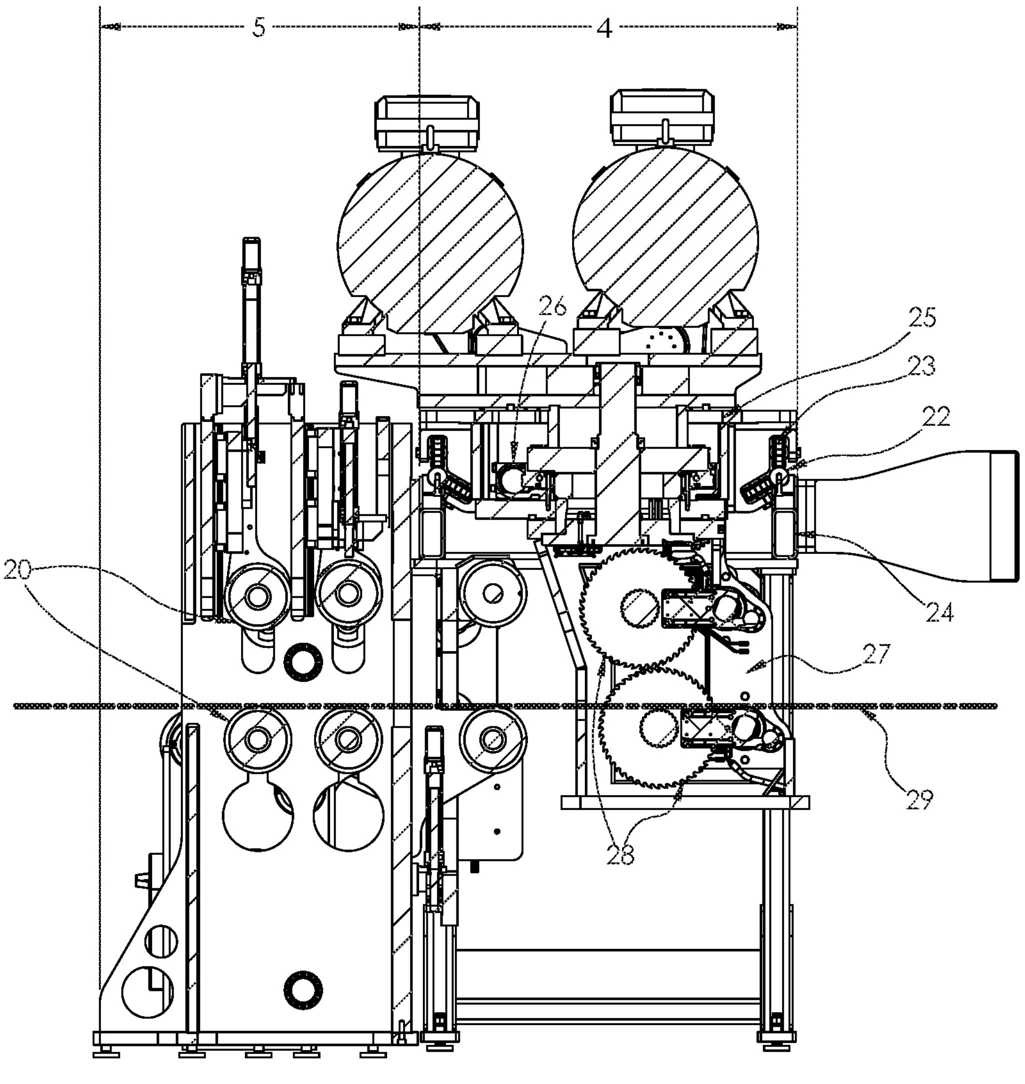
FIG. 3 is an elevation section view of the Curve sawing gang with outfeed module, with flow showing from right to left. The section is taken at the centerline of the workpiece feed.
Figure 5:
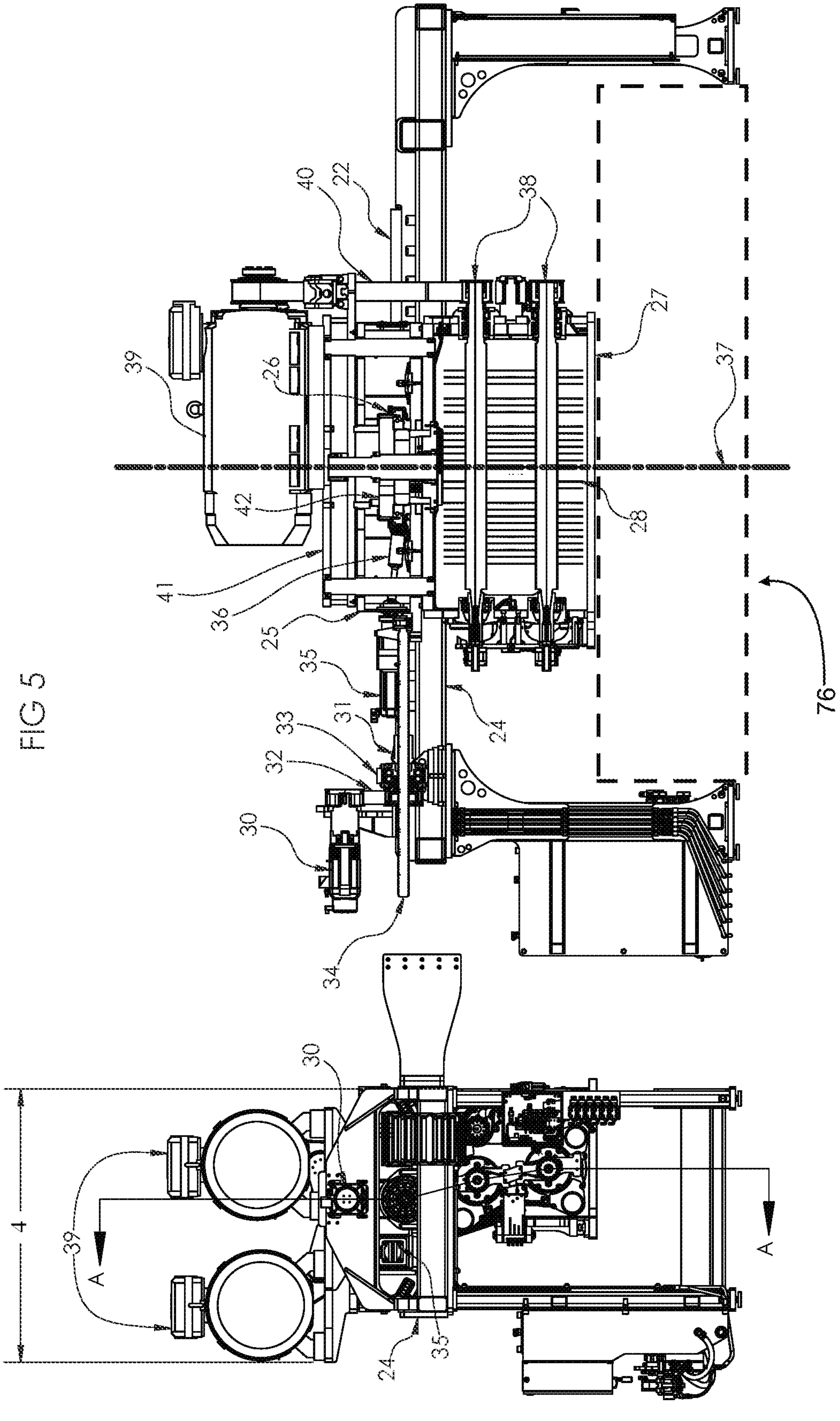
FIG. 5 is an elevation side view of the curve sawing gang with a section view about the “A” section line.

Referring now to FIG. 1, FIG. 3 and FIG. 5, the curve sawing gang 4 hanging over the top of the workpiece 6 is mounted to a linear shaft 22 and rides on linear bearings 23. The linear shaft 22 is mounted to the overhead support structure 24 that is supported by the out feed module 5 and the mid feed module 3. As shown by a dotted line, an opening 76 is located in the overhead support structure, below the horizontal beam, between the vertical legs, below the level of the feedline. The linear bearings 23 are attached to the curve sawing gang carriage 25, that translates in a perpendicular direction to the flow of the workpiece. The curve sawing gang carriage 25 contains a pivot bearing drive assembly 26 that allows the curve sawing gang saw box 27 to pivot plus or minus six degrees to allow the saws 28 to follow the curvature of a cant. The overhead support structure 24, linear shaft 22 and linear bearings 23 are all mounted over the top of the workpiece feed line 29. The workpiece 6 is driven and controlled by the powered feed rolls 20.

Referring to FIG. 3 and FIG. 5, the curve sawing gang 3, uses an electric servo motor 30 coupled to a ball nut 31 by way of a timing belt 32. The ball nut 31 is attached to the overhead support structure 24 by way of a bearing housing 33. The ball nut 31 drives a ball screw 34 that is fixed to the curve sawing gang carriage 25. The ball screw 34 does not rotate, allowing the ball nut 31 to achieve higher speeds due to removal of the ball screw 34 whipping motion that is typical of long length shafts spinning at high RPMs. This ball nut 31 and ball screw 34 assembly moves the curve sawing gang 3 in the perpendicular direction relative to the flow of the workpiece. The curve sawing gang 3 pivot motion is driven by a second servo motor 35 that is attached to the curve sawing gang carriage 25 and coupled to a driveshaft assembly 36 which is attached to the pivot bearing drive assembly 26. The pivot bearing drive assembly 26 contains a large diameter four-point contact bearing that is twenty-five inches in diameter in this example. The pivot bearing drive assembly 26 also contains a worm gear that drives the outer race of the four-point contact bearing. The drive shaft assembly 36 is directly coupled to the worm gear, resulting in angular motion of the curve sawing gang saw box 27 about the saw box pivot axis 37 that is concentric to the pivot bearing drive assembly 26.

Referring to FIG. 5, the curve sawing gang 3 has saw arbors 38 that provide power to the saws 28. In this example, the curve sawing gang 3 contains two saw arbors 38. The saw arbors 38 are driven by electric motors 39, one electric motor 39 per saw arbor 38. The electric motors 39 are coupled to the saw arbors 38 by way of a timing belt 40. The electric motors 39 are mounted to a pivoting motor base 41 that is coupled to the curve sawing gang saw box 27 and the pivot bearing drive assembly 26 by way of a pivoting coupler assembly 42. The electric motors 39 are mounted very close to the saw box pivot axis 37 and rotate with the curve sawing gang saw box 27.

Figure 7:
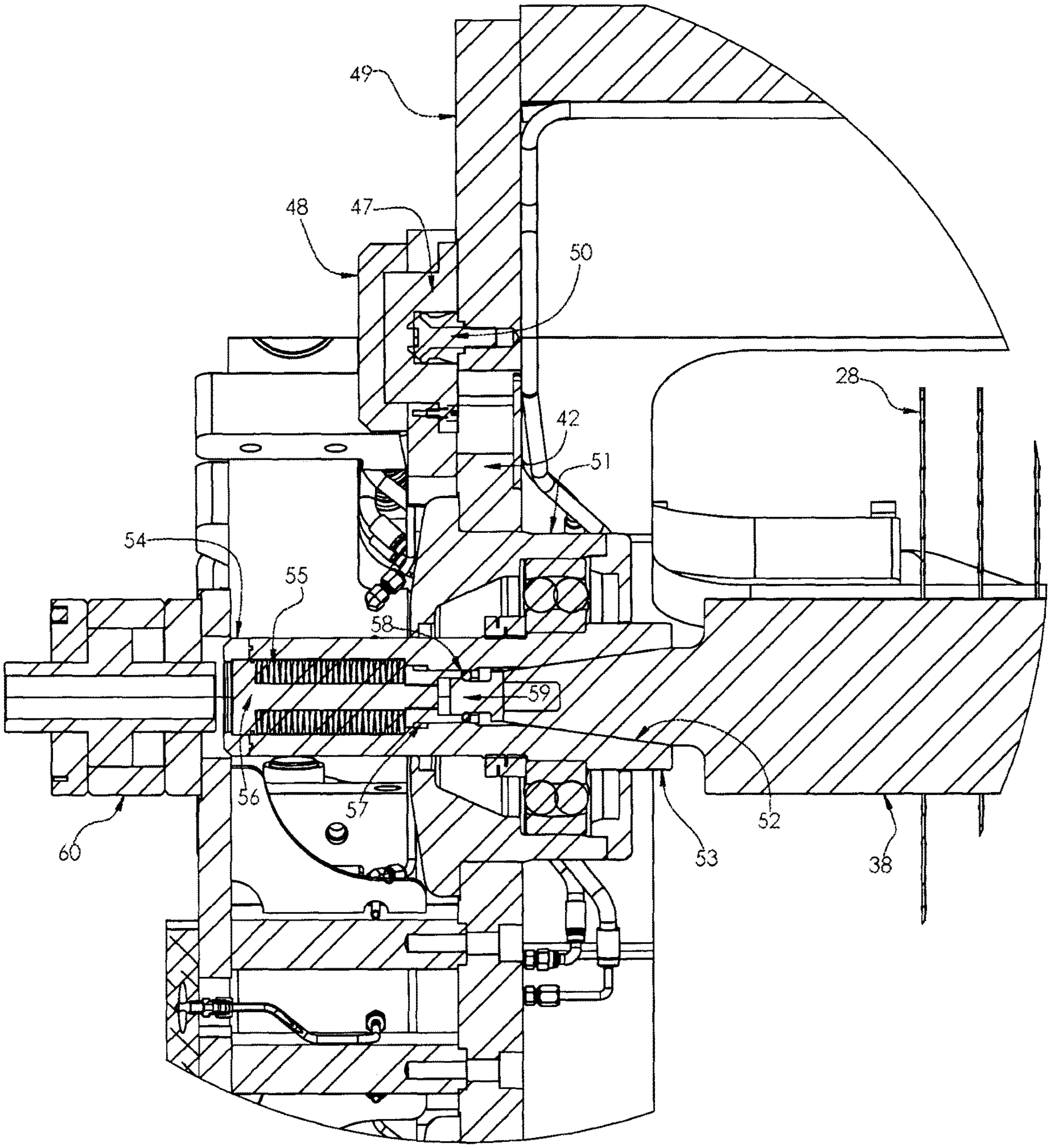
FIG. 7 is the detail view "A" from FIG. 6.

Looking at FIG. 6 and FIG. 7 the curve sawing gang saw box 27 has an arbor door 42 that opens to gain access to the saws 28 and saw guides 43. The arbor door 42 opens on a pivot bearing 44 and a linear bearing 45 and linear rail 46. The arbor door 42 is shown in the closed position. When the arbor door 42 is closed, it is clamped shut using clamping mechanisms 47 that are spring engaged, hydraulically released. The clamping mechanisms 47 are attached to the arbor door 42 by way of machined housings 48. The clamping mechanisms 47 clamp the arbor door 42 against the curve sawing gang saw box door side-side plate 49. The clamping mechanisms 47 mate with a tapered pull stud 50 that is bolted to the curve sawing gang saw box door-side side plate 49. The arbor door 42 supports one end of the saw arbor 38 with a bearing assembly 51. The saw arbor 38 has a male tapered end 52 that mates to the arbor nose cone 53 that is fastened to the bearing assembly 51. The bearing assembly 51 is fastened to the arbor door 42. The arbor nose cone 53 pulls tight against the male tapered end 52 with a pull stud mechanism 54. The pull stud mechanism 54 uses conical washers 55 that apply force to a draw bar 56 that is attached to a hardened ball retainer 57. There are hardened balls 58 spaced equidistant around the diameter of the draw bar 56. Attached to the saw arbor 38 is an arbor pull stud 59. The arbor pull stud 59 has a tapered feature that the hardened balls 58 come into contact with when the conical washers 55 push the hardened ball retainer 57 away from the pull stud 59, causing the arbor nose cone 53 to pull tight against the male tapered end 52 of the saw arbor 38. To open the arbor door 42, first, hydraulic pressure releases the four clamping mechanisms 47, then there is a hydraulic cylinder 60 that when actuated, presses against the draw bar 56, collapsing the conical washers 55. When the hardened ball retainer 57 that is attached to the draw bar 56 hits the pull stud 59, it pushes the arbor nose cone 53 away from the male tapered end 52 of the saw arbor 38.

Figure 8:
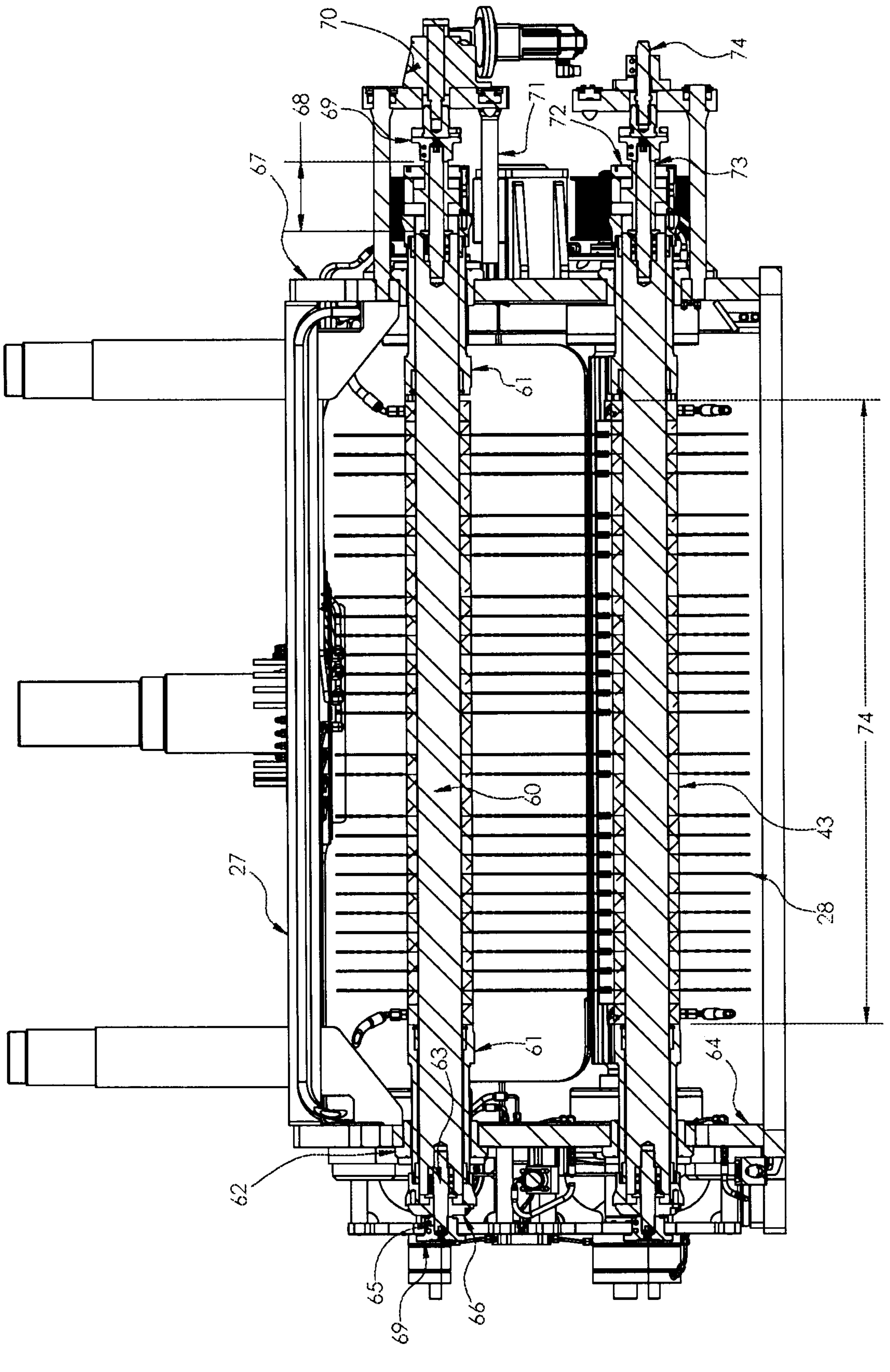
FIG. 8 is the section view about section line "C" from FIG. 6.
Figure 9:
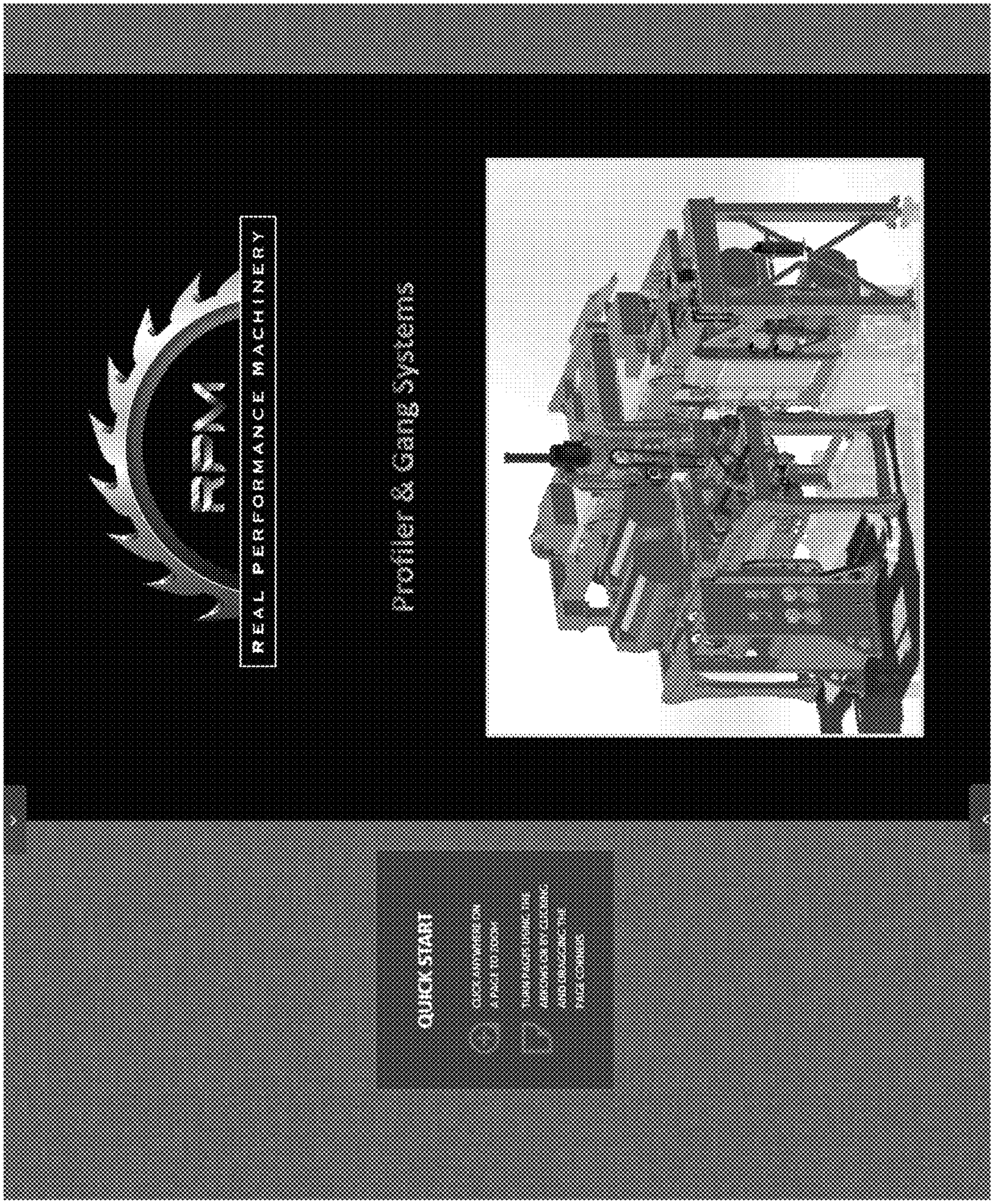
Figure 10:
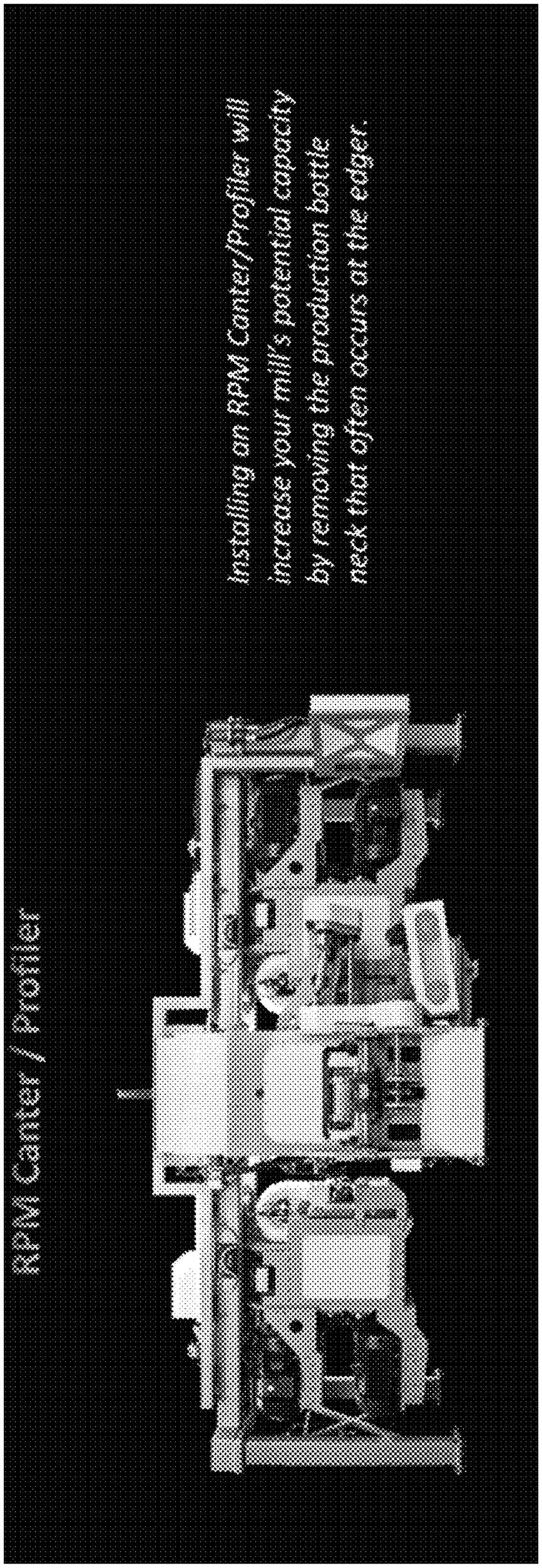
Figure 11:
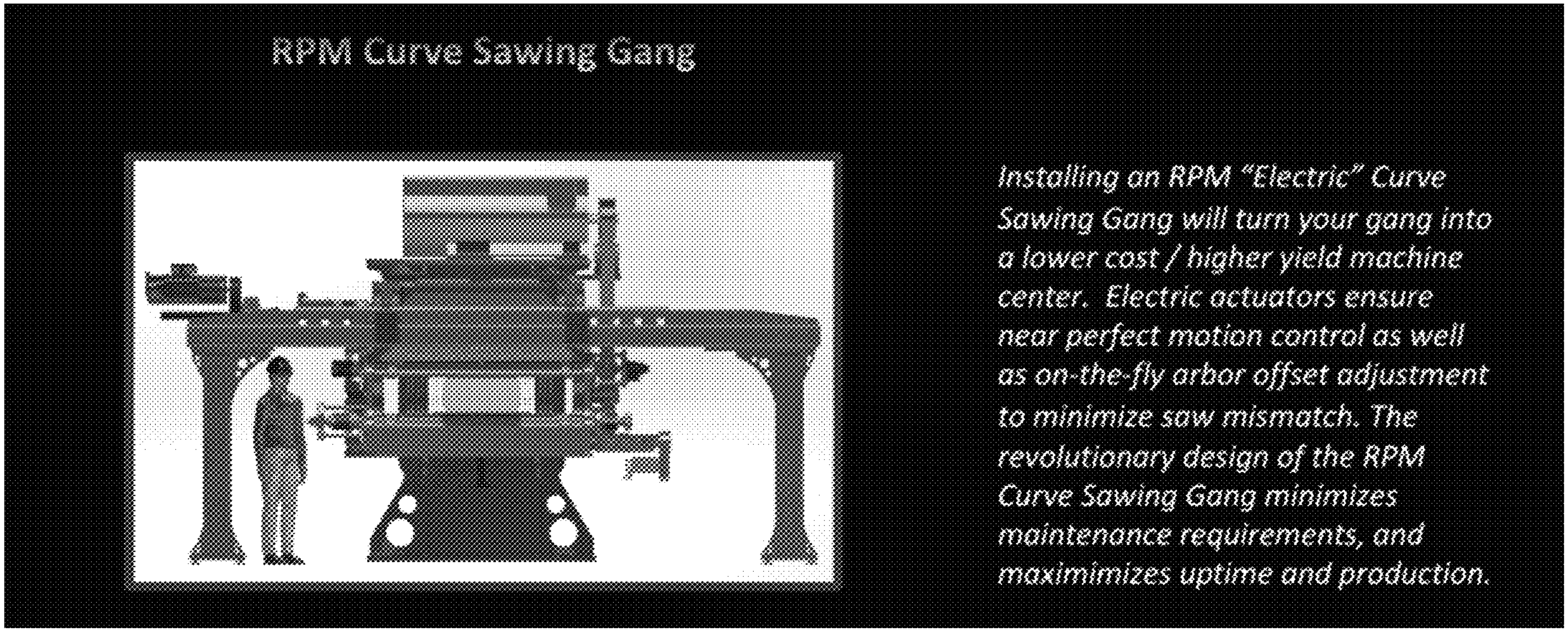
Figure 12:
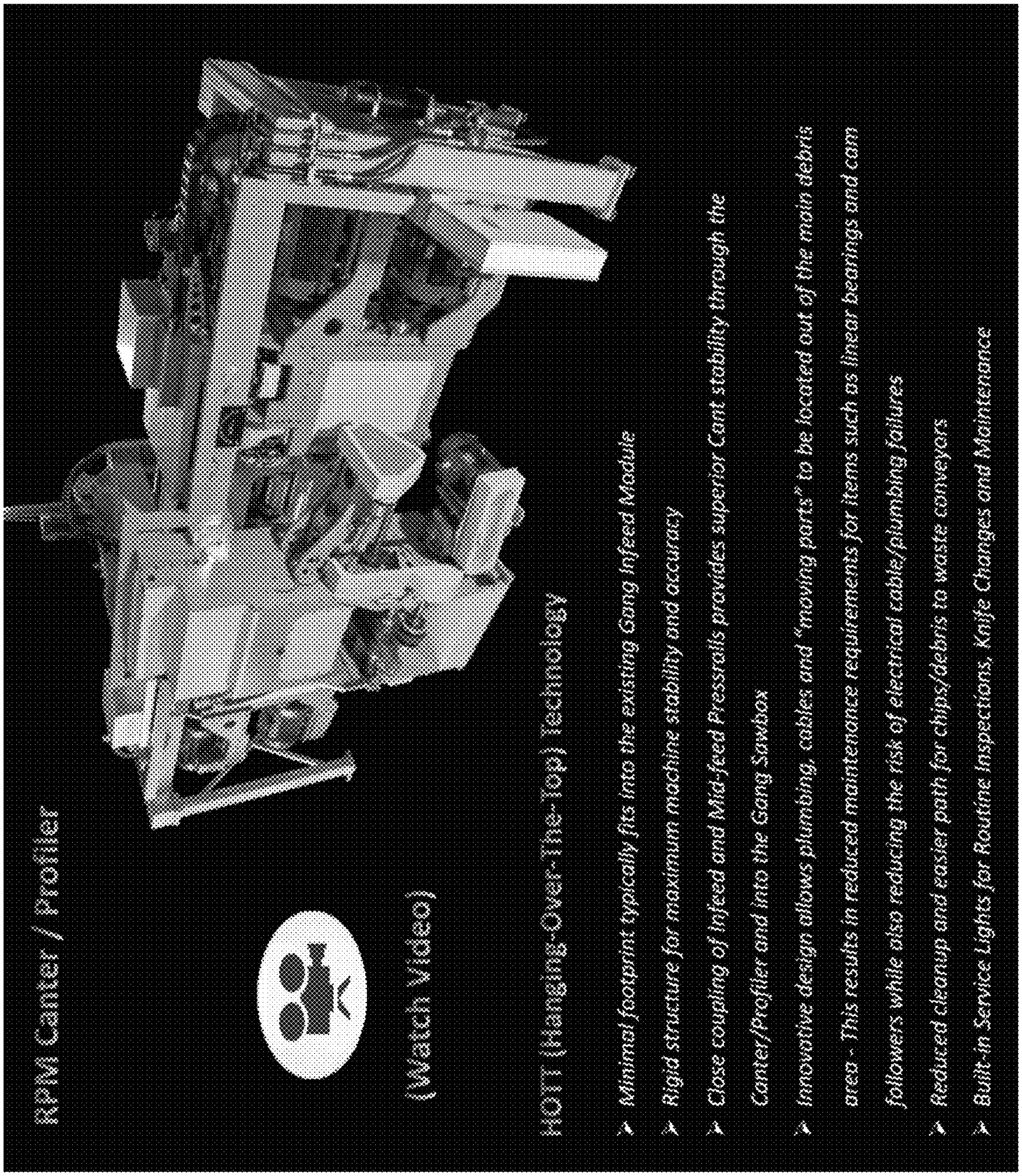
Figure 13:
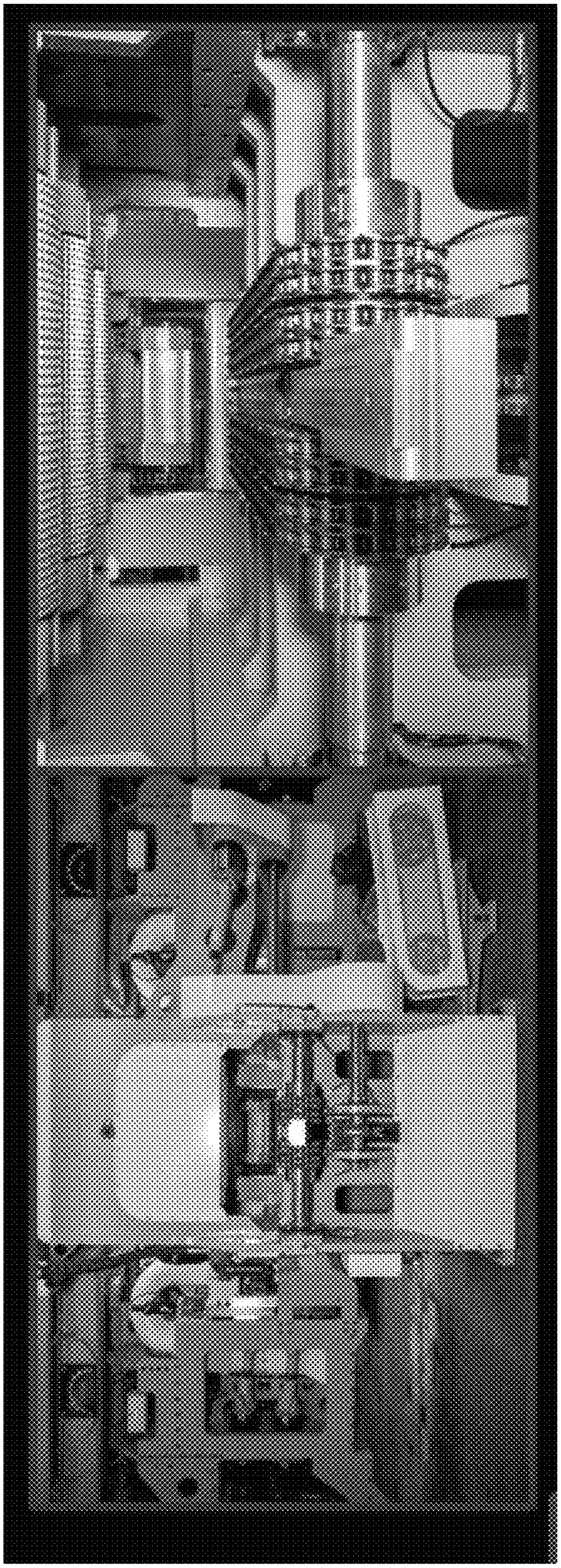
Figure 14:
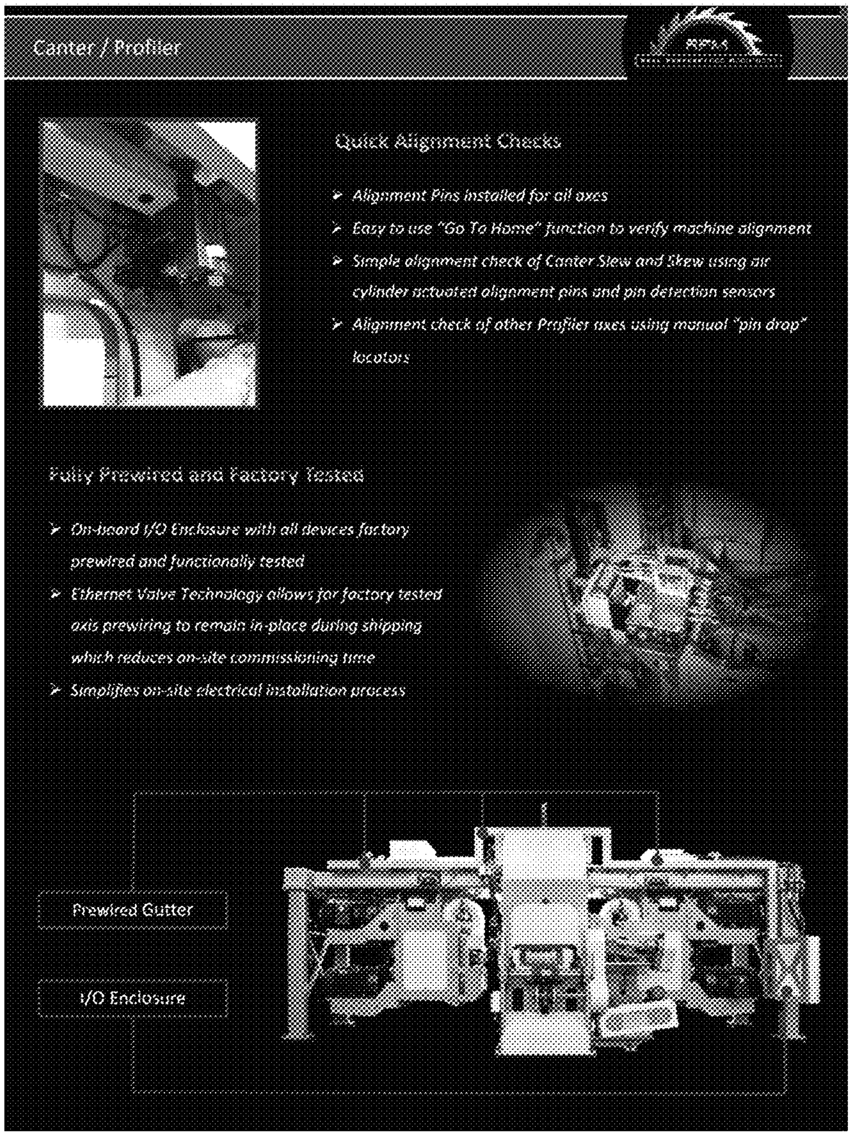
Figure 15:
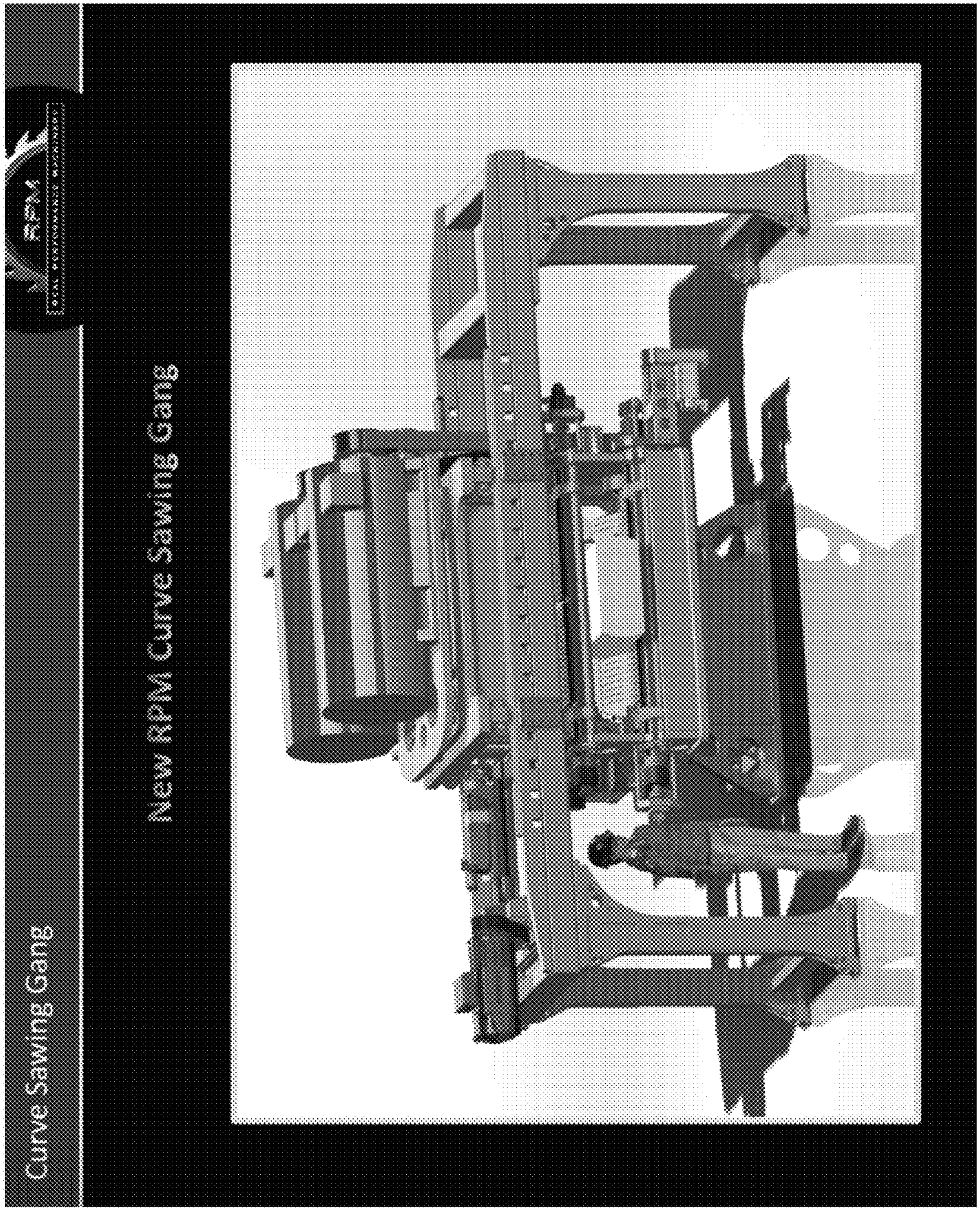
Figure 16:
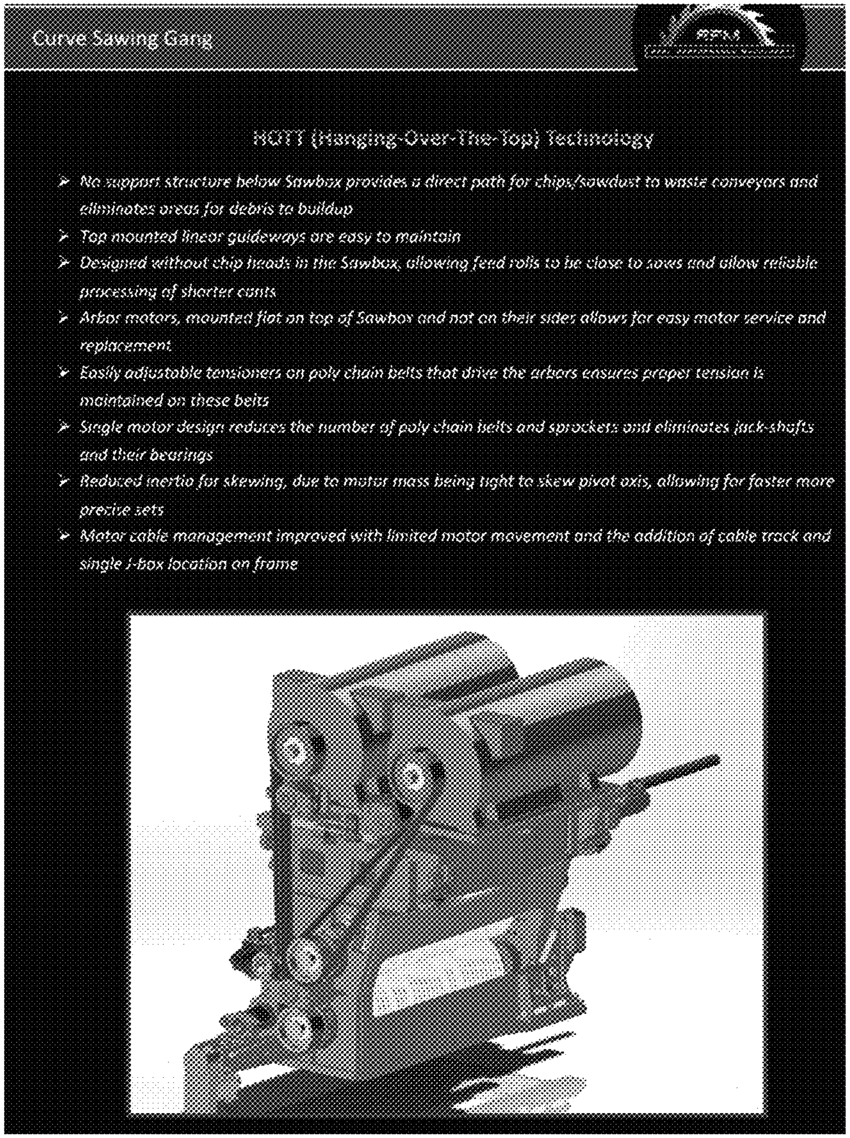
Figure 17:
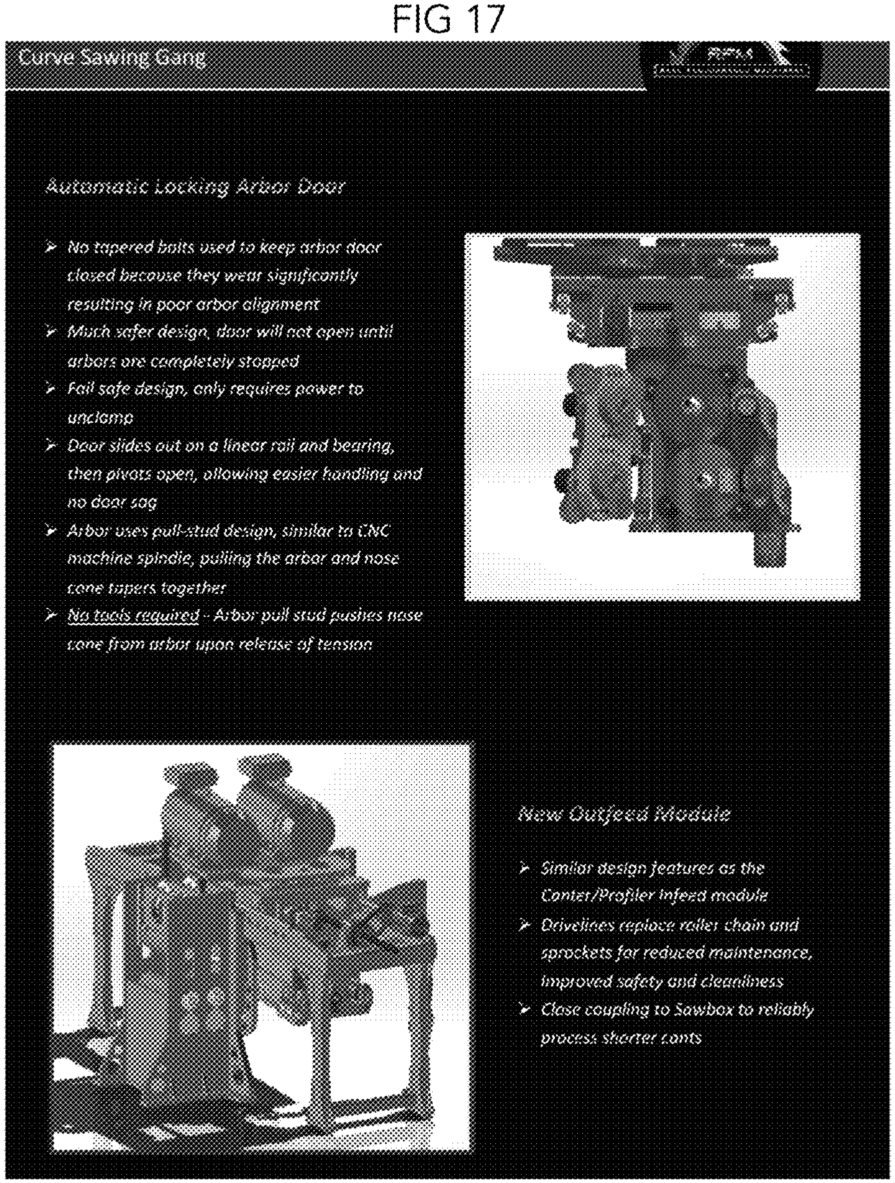
Figure 18:
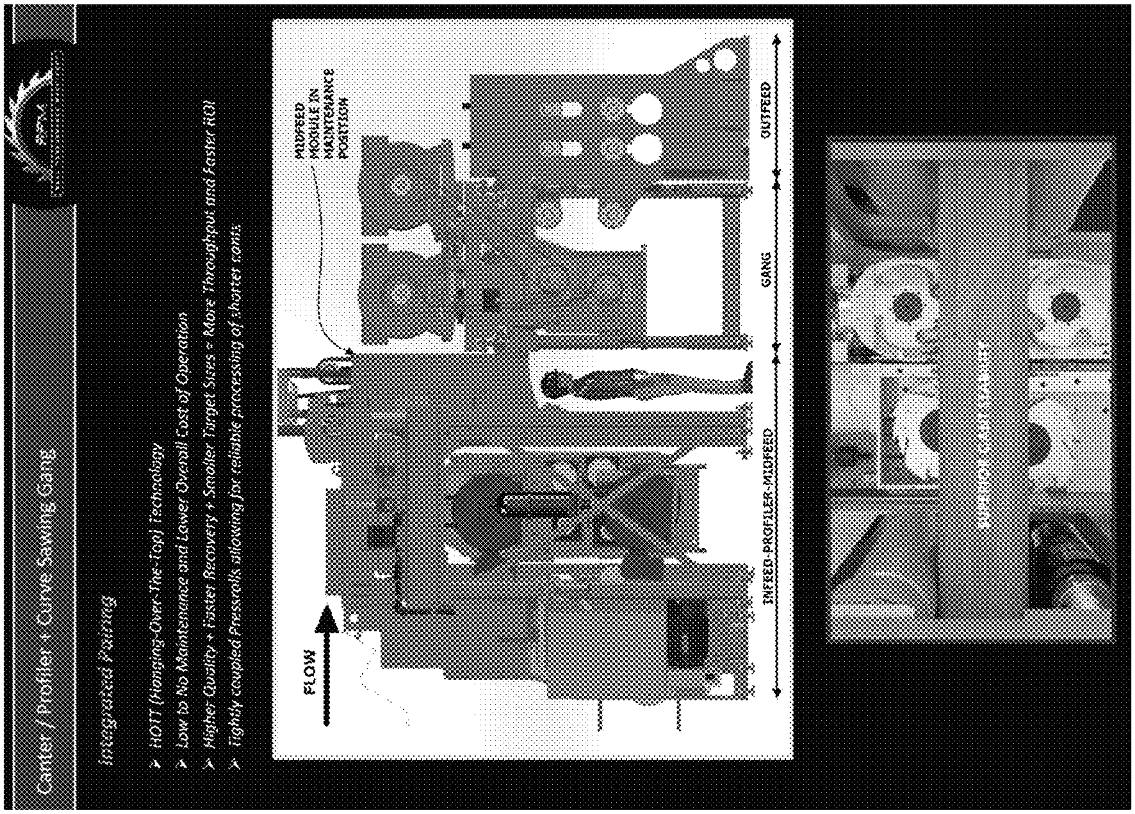
Figure 19:
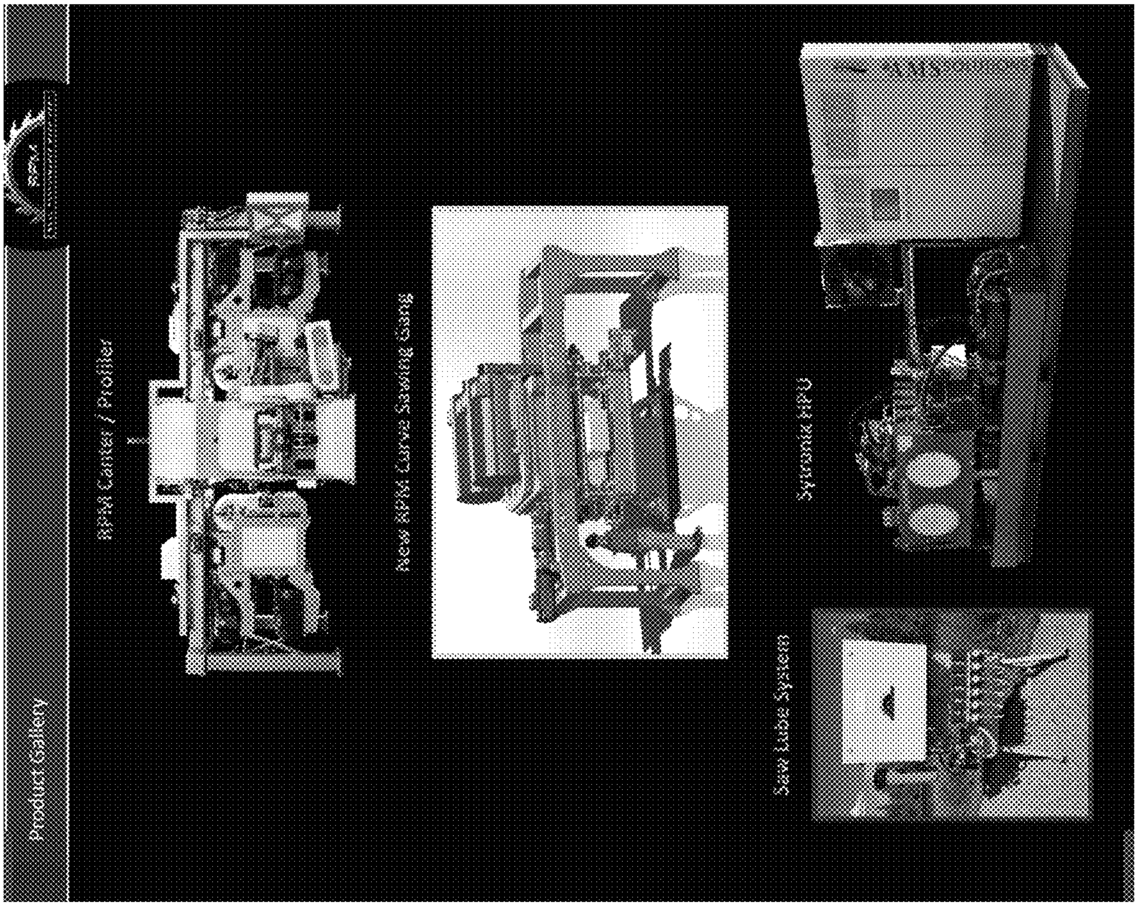
Figure 20:
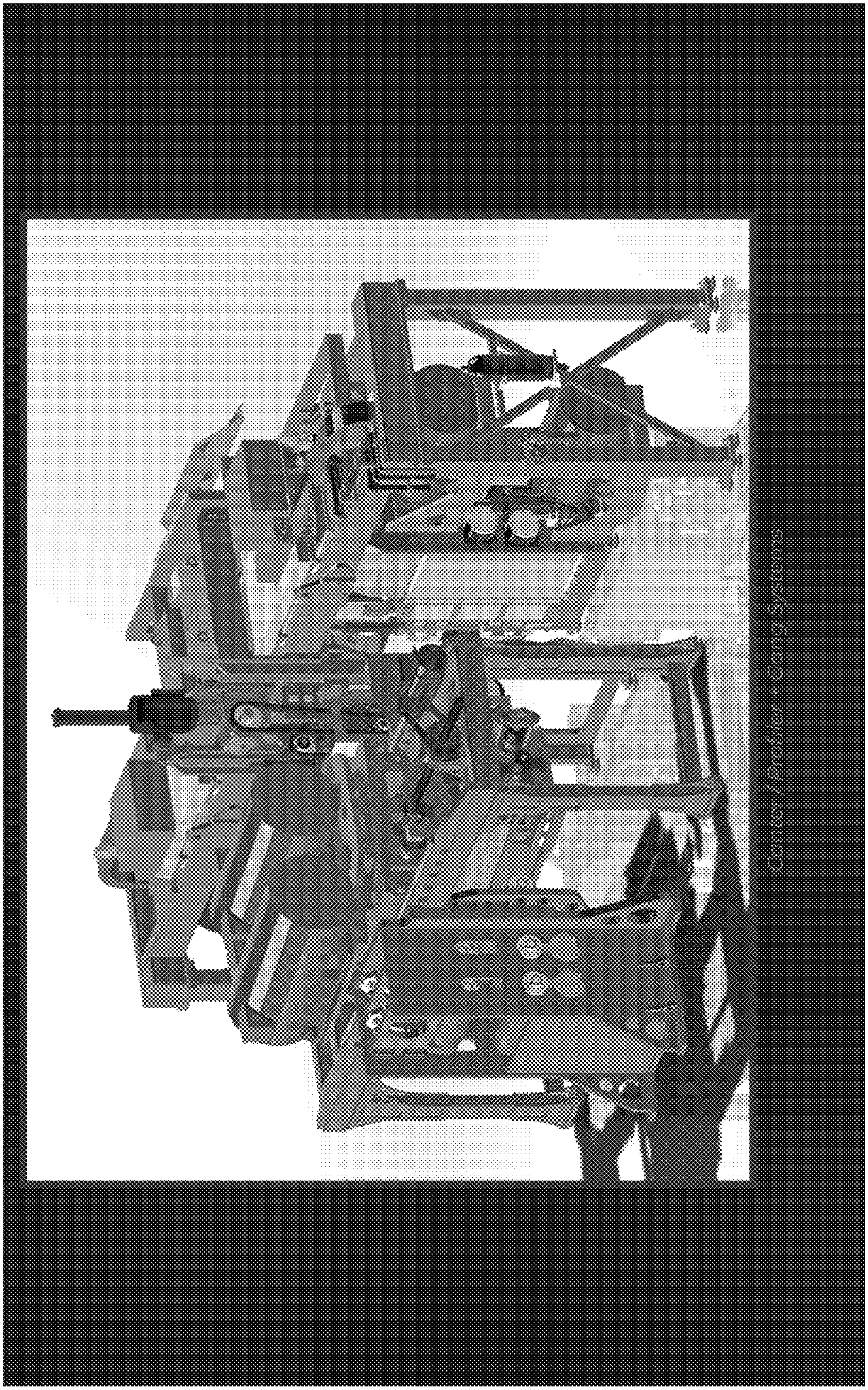
Figure 21:
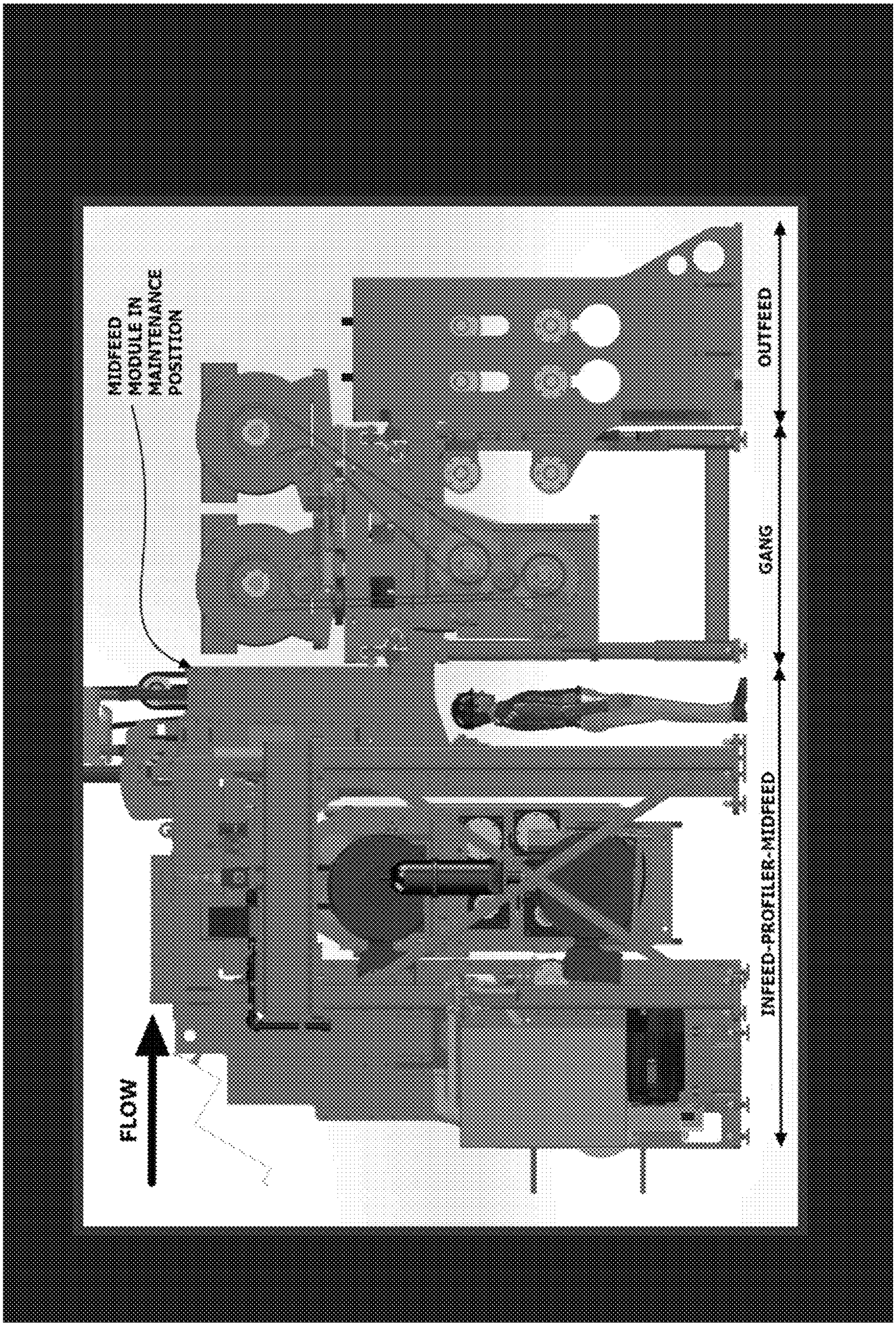
Figure 22:
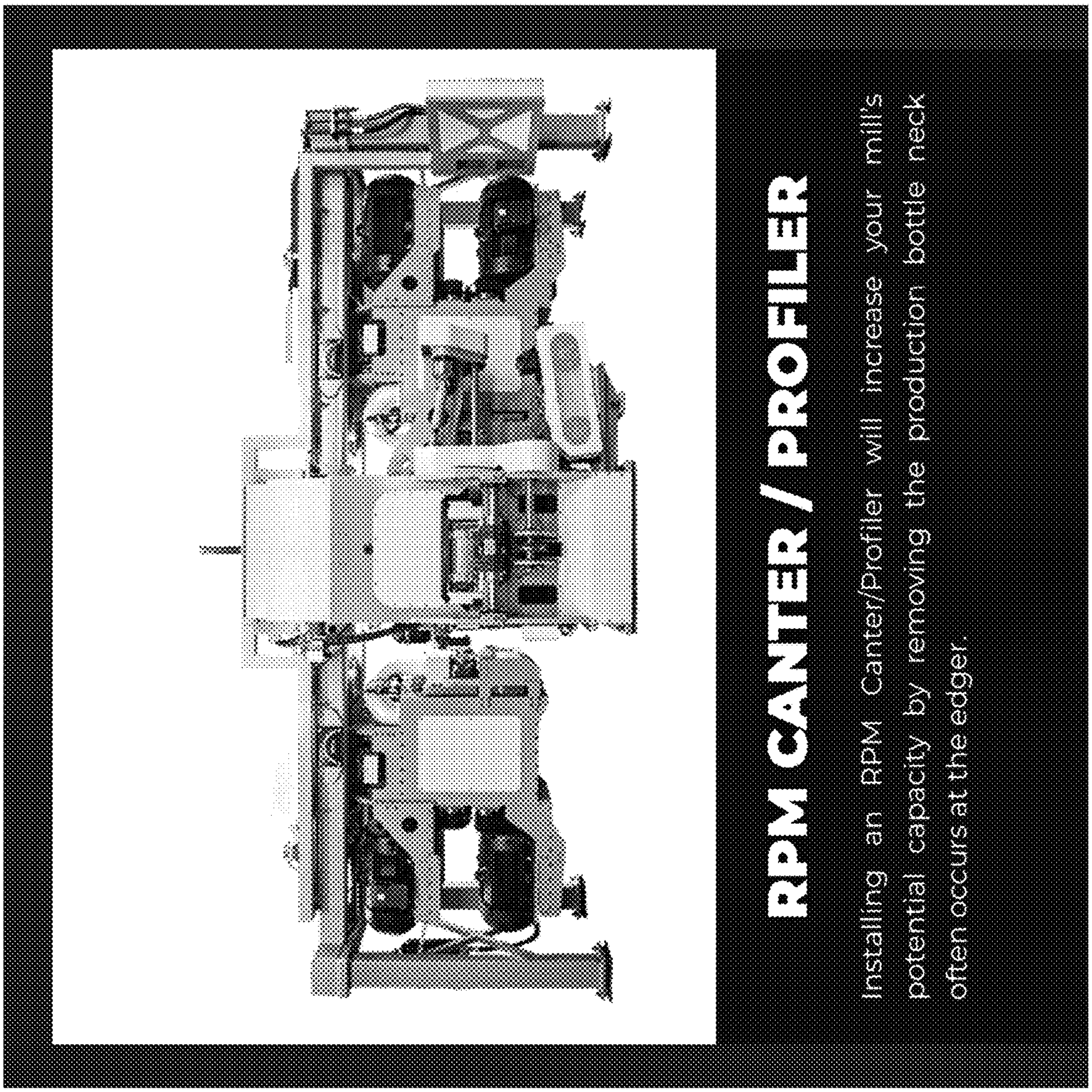
Figure 23:
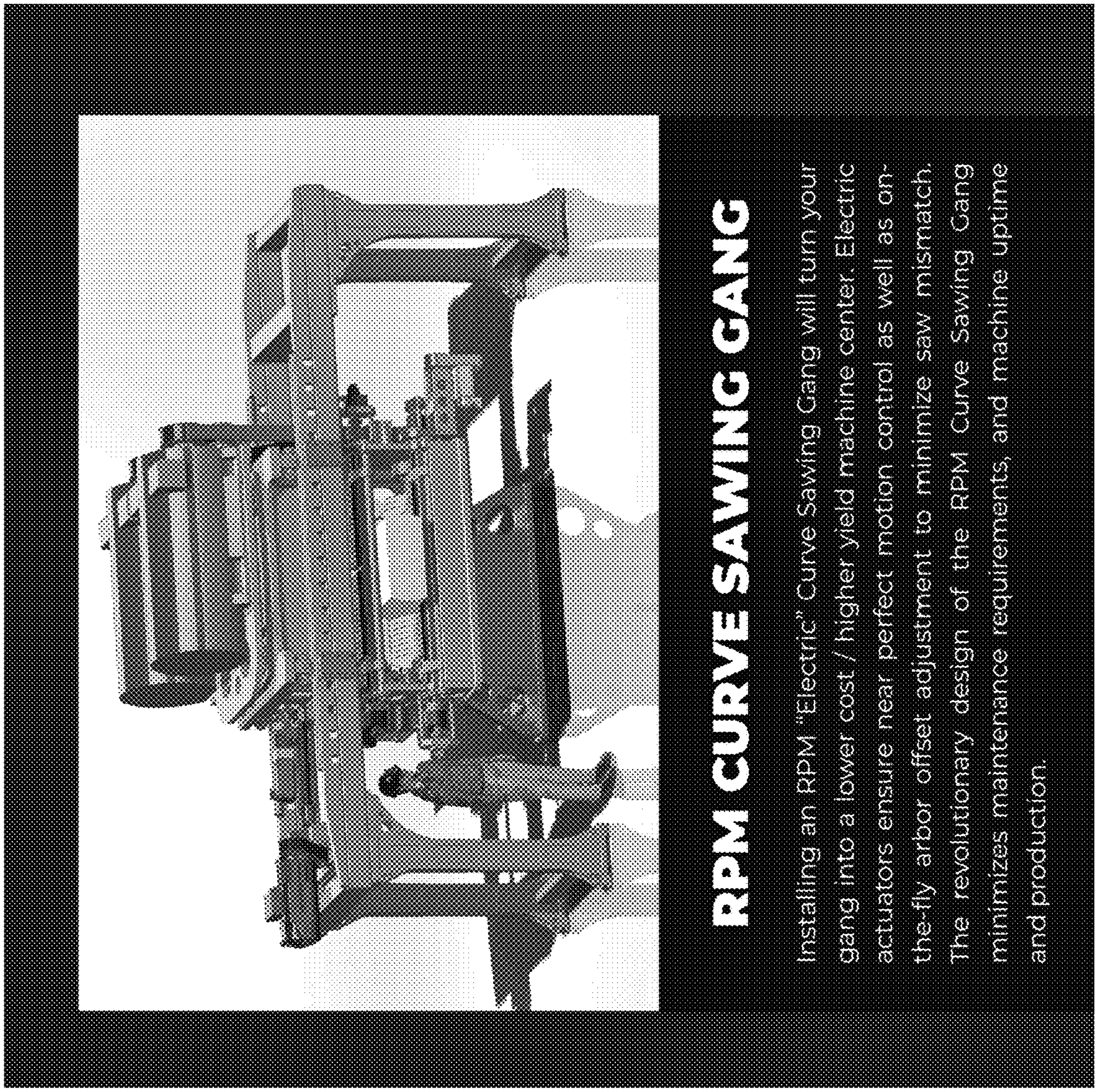
Figure 24:
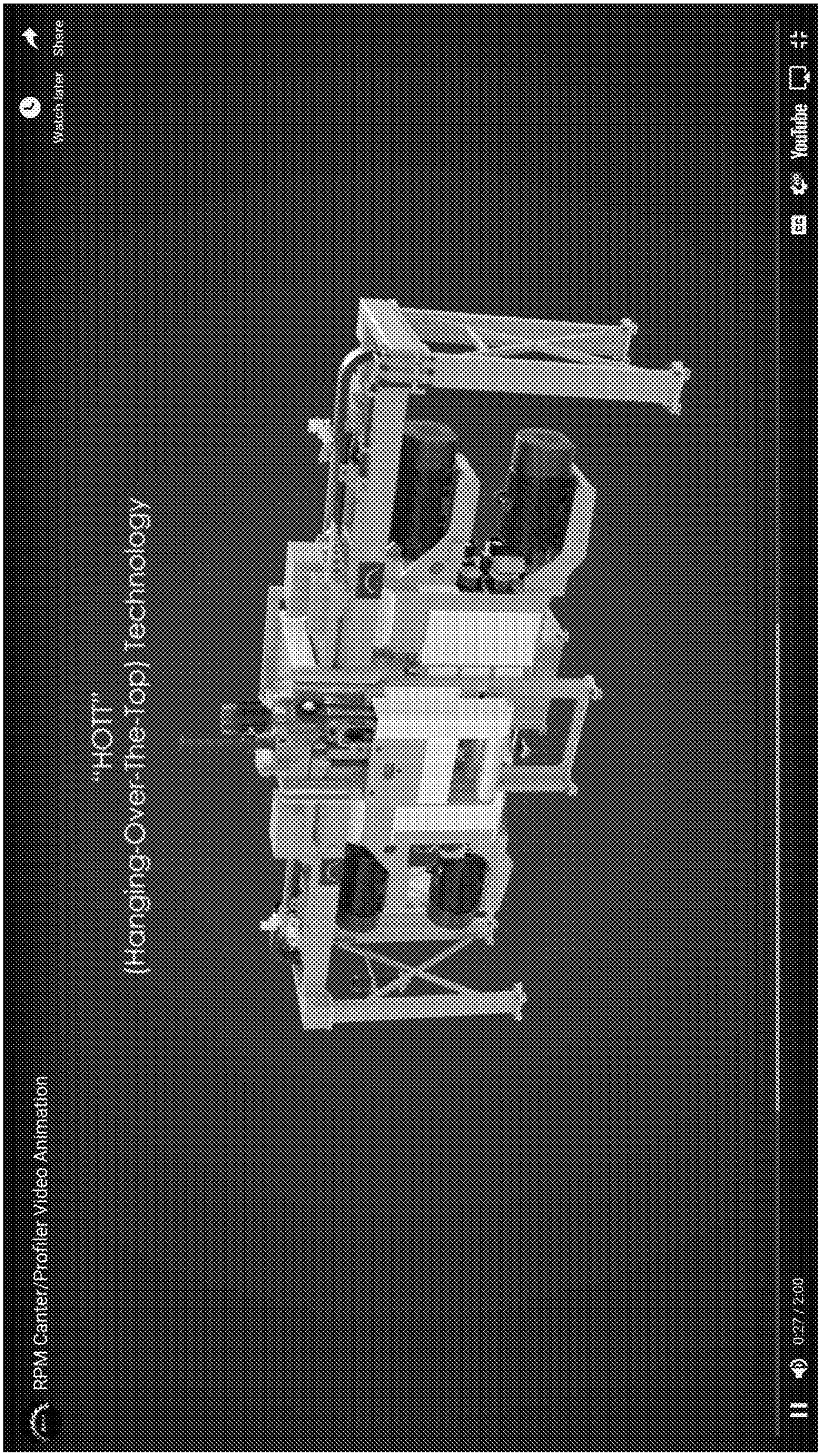
Figure 25:
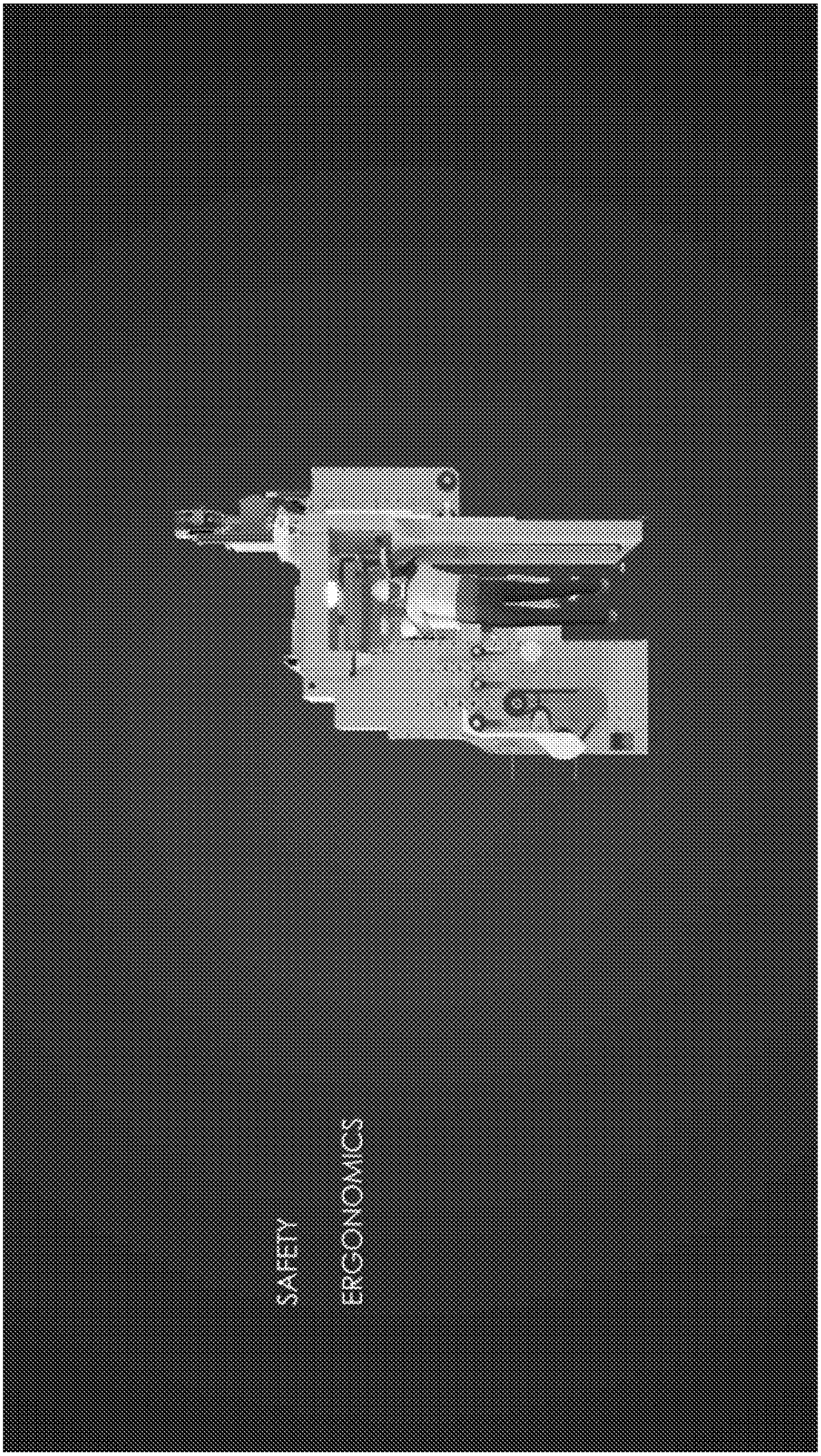
Figure 26:
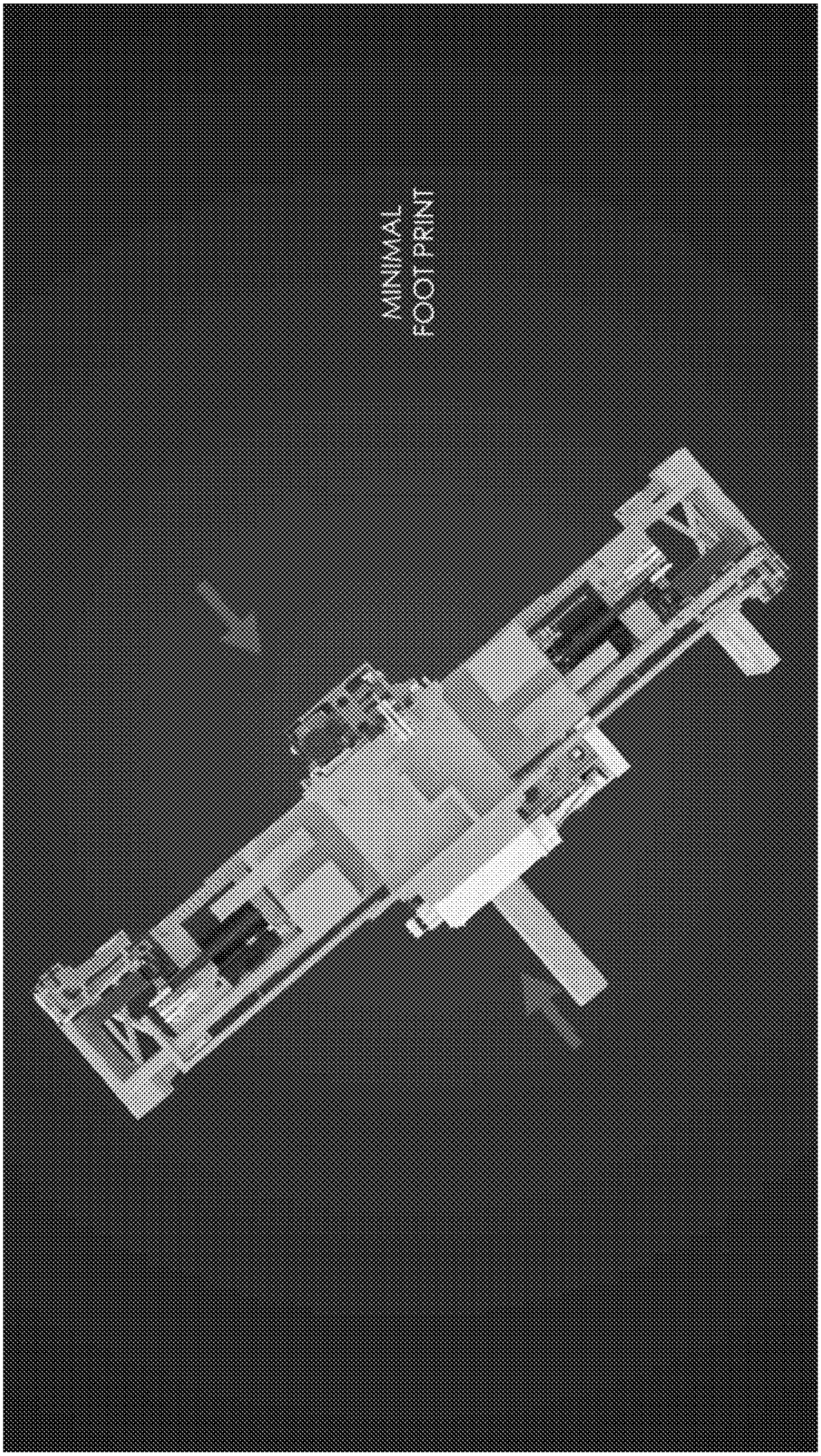
Figure 27:
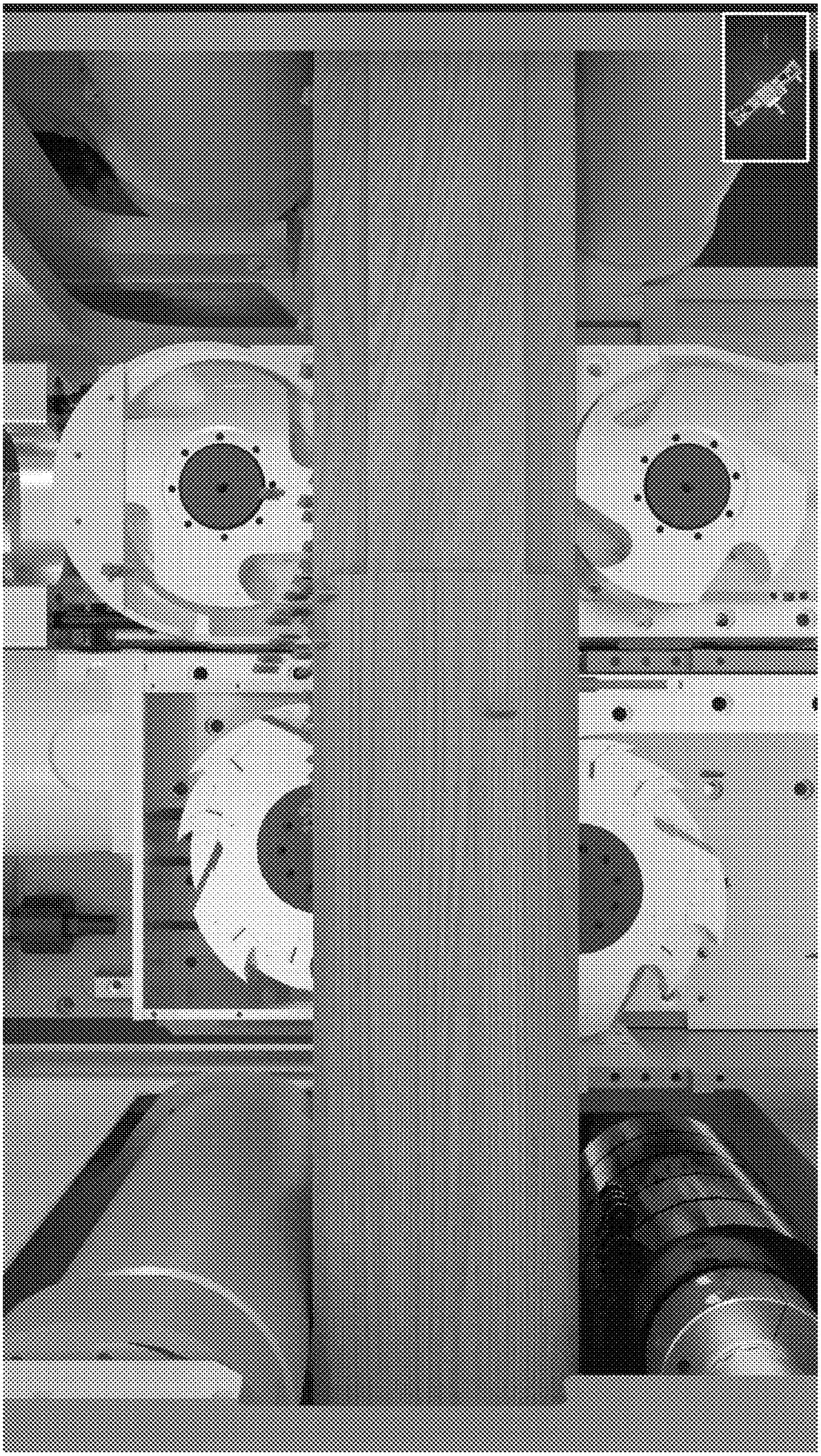
Figure 28:
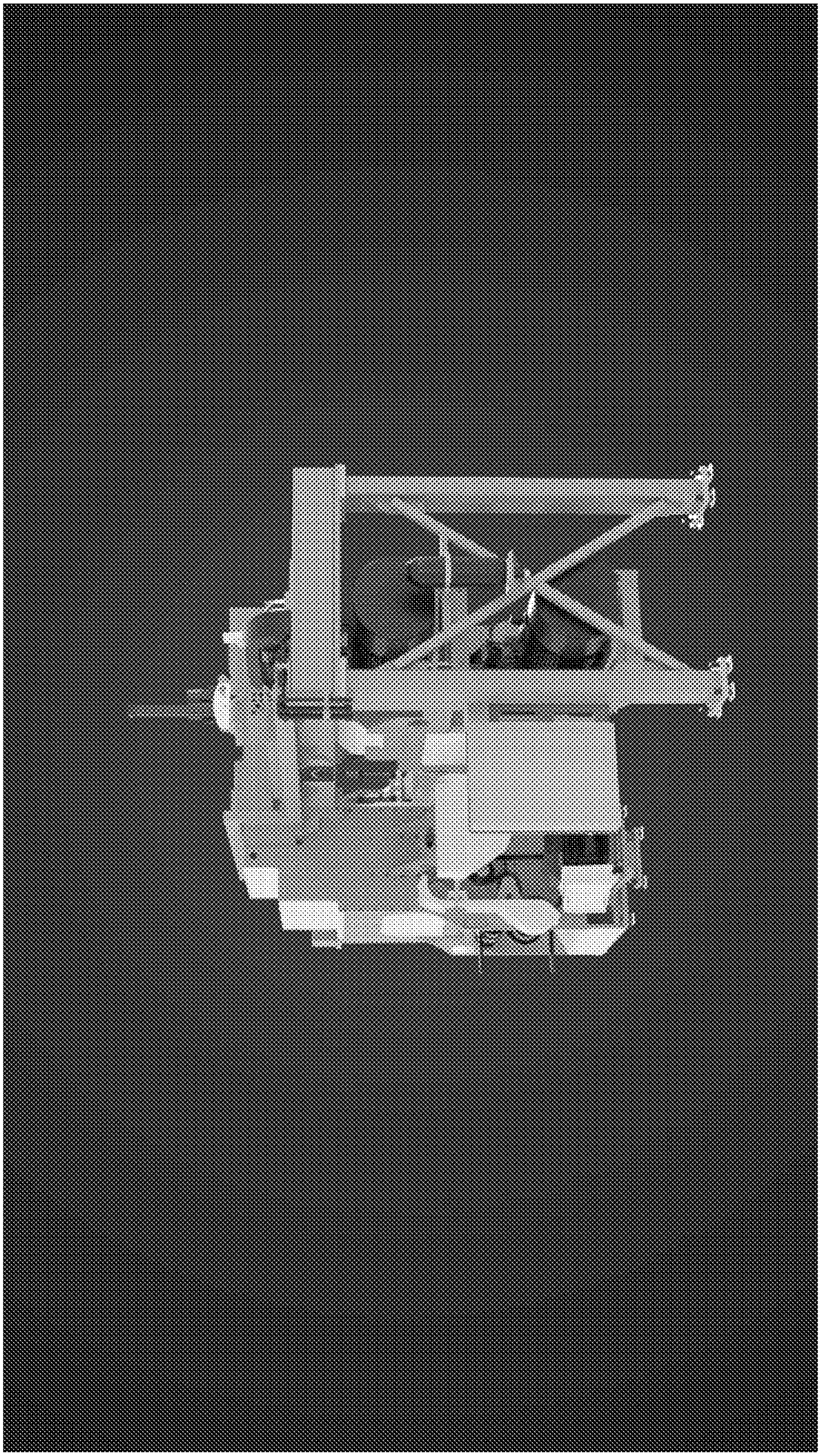
Figure 29:
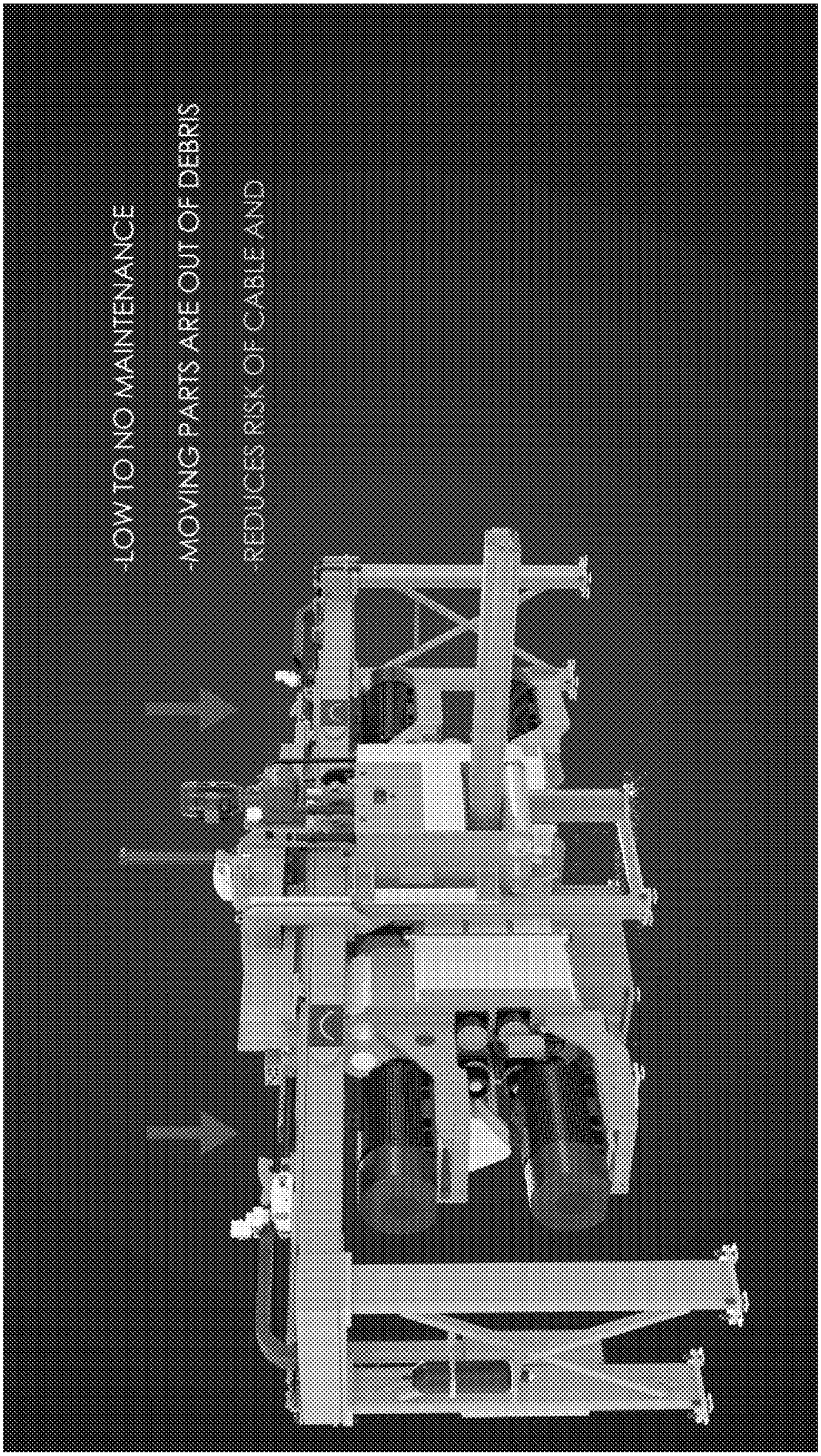
Figure 30:
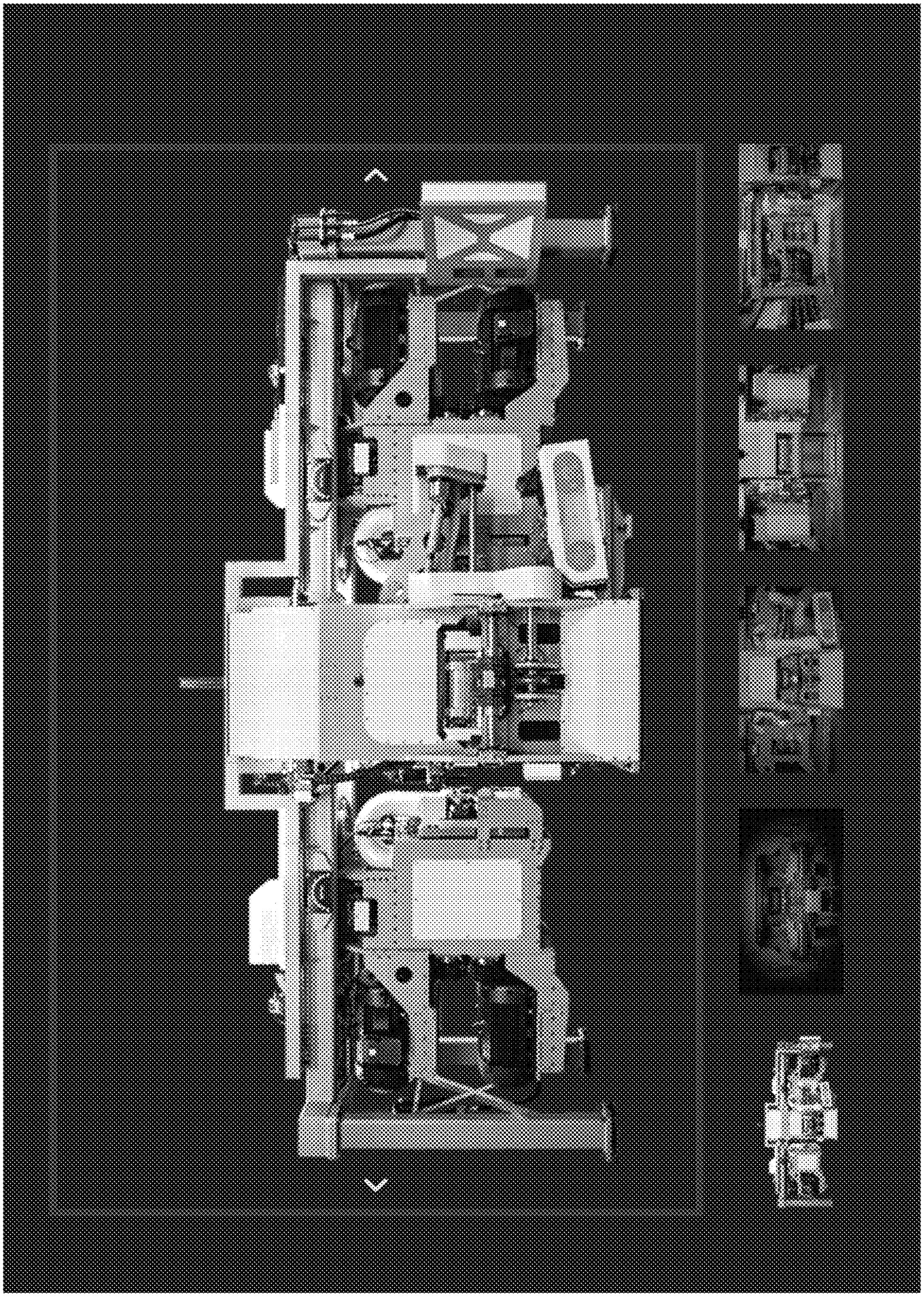
Figure 31:
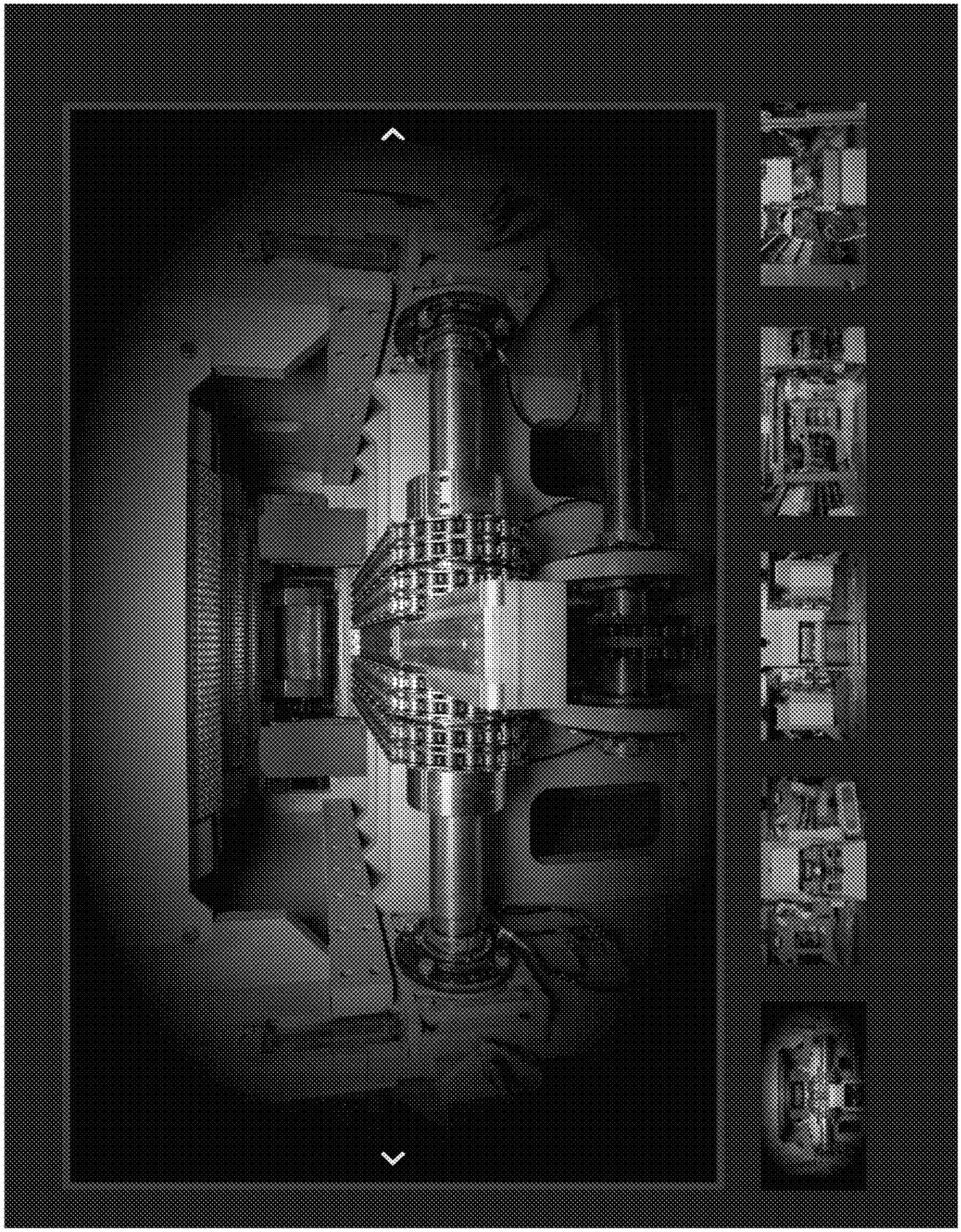
Figure 32:
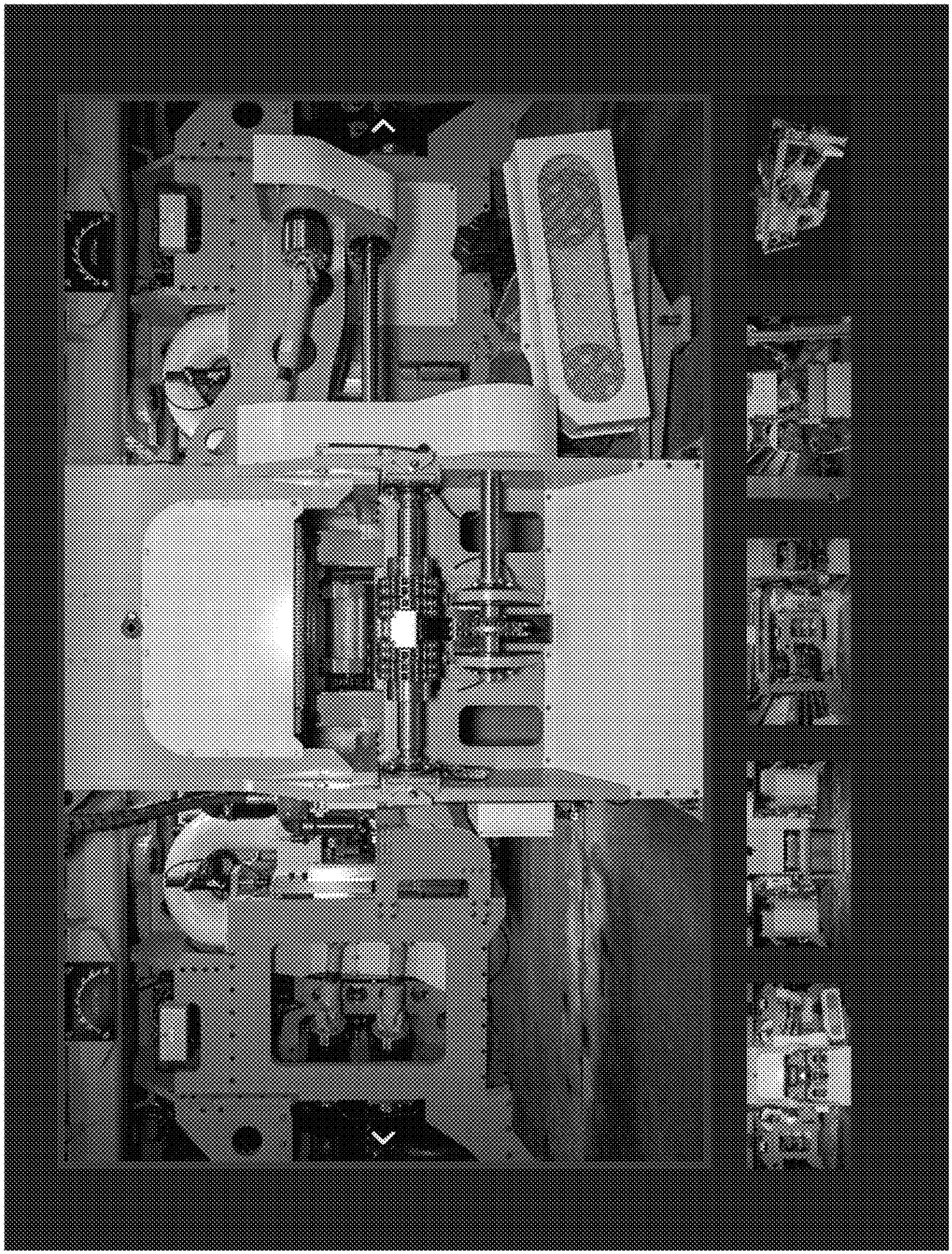
Figure 33:
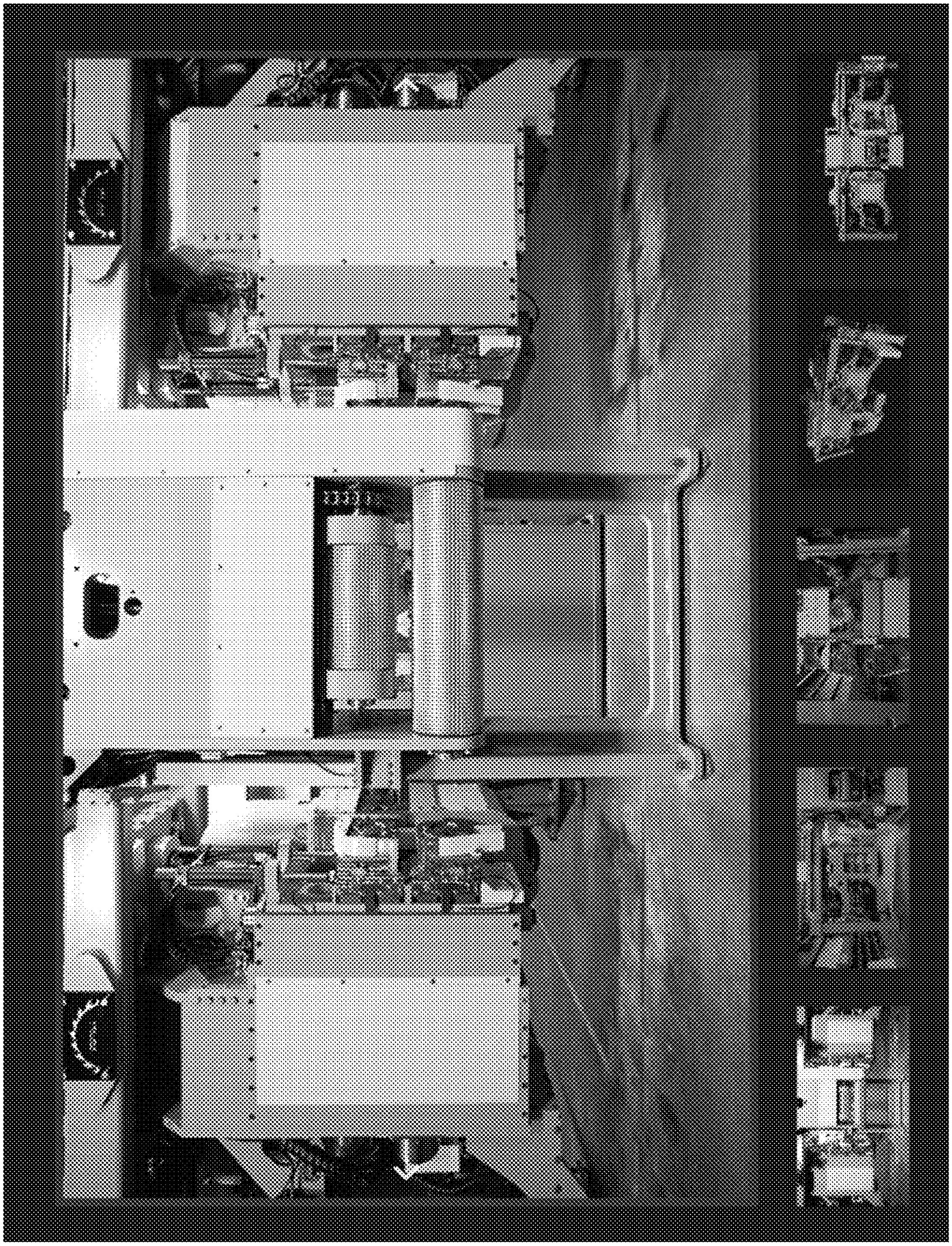
Figure 34:
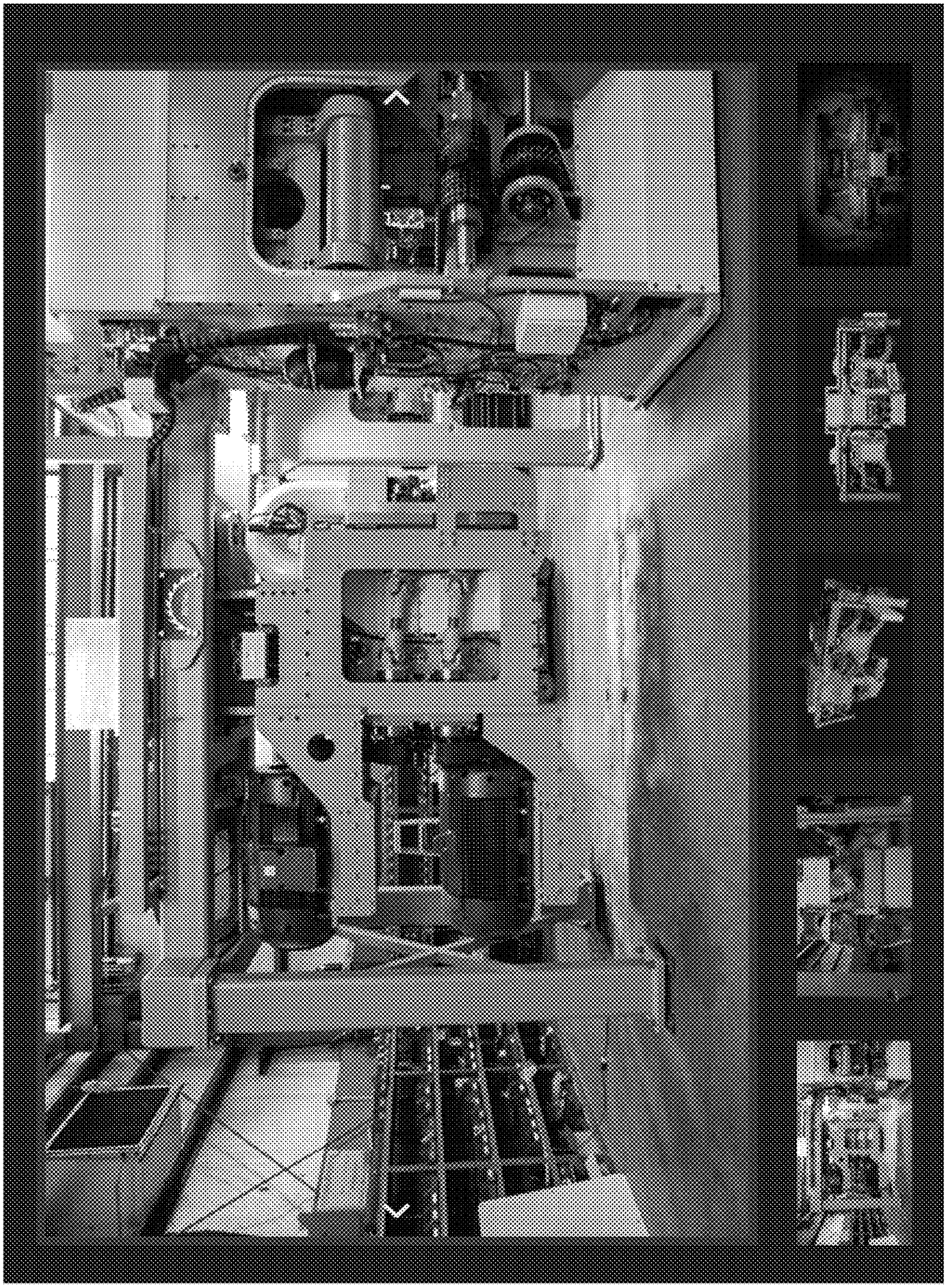
Figure 35:
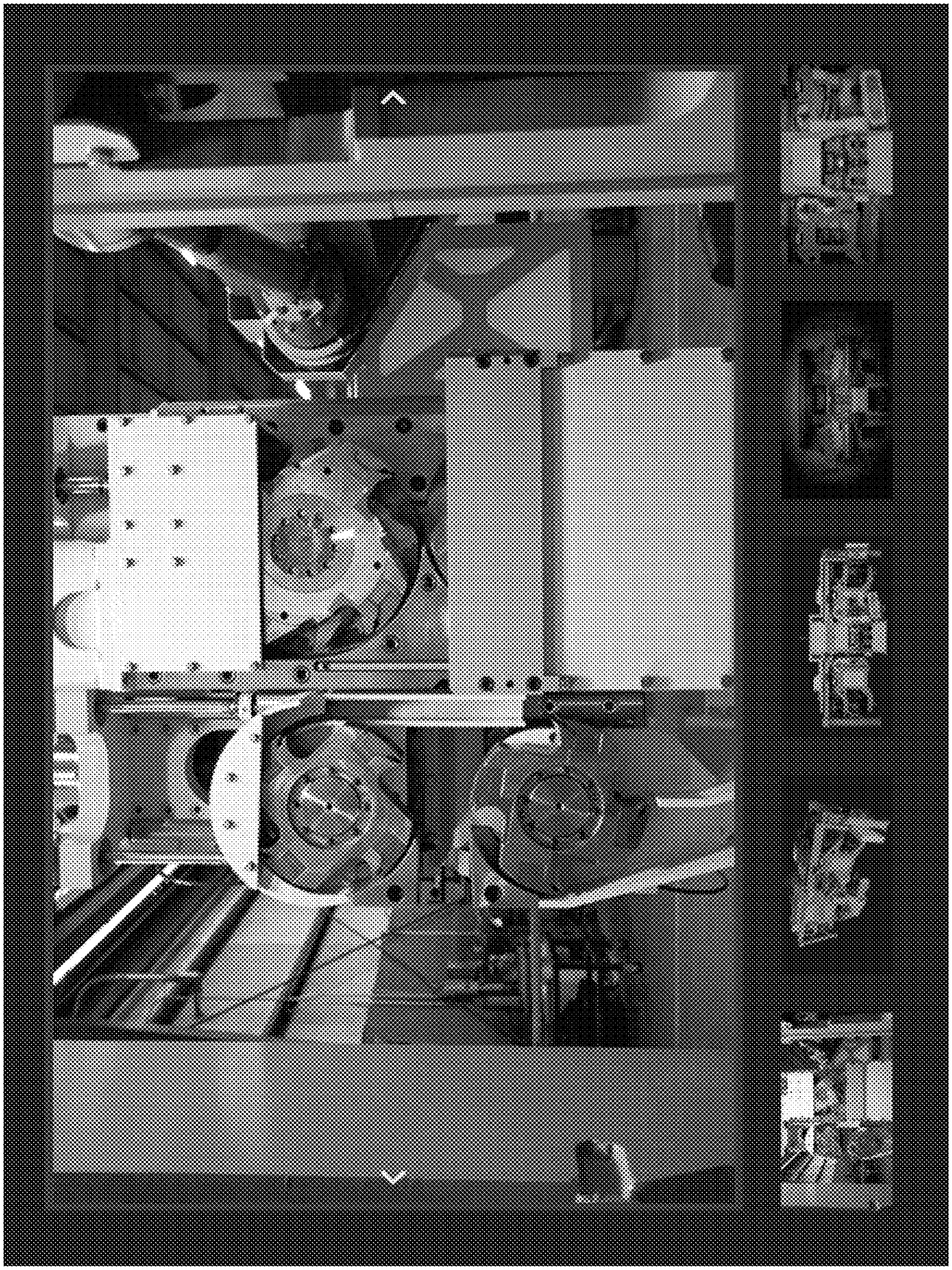
Figure 36:
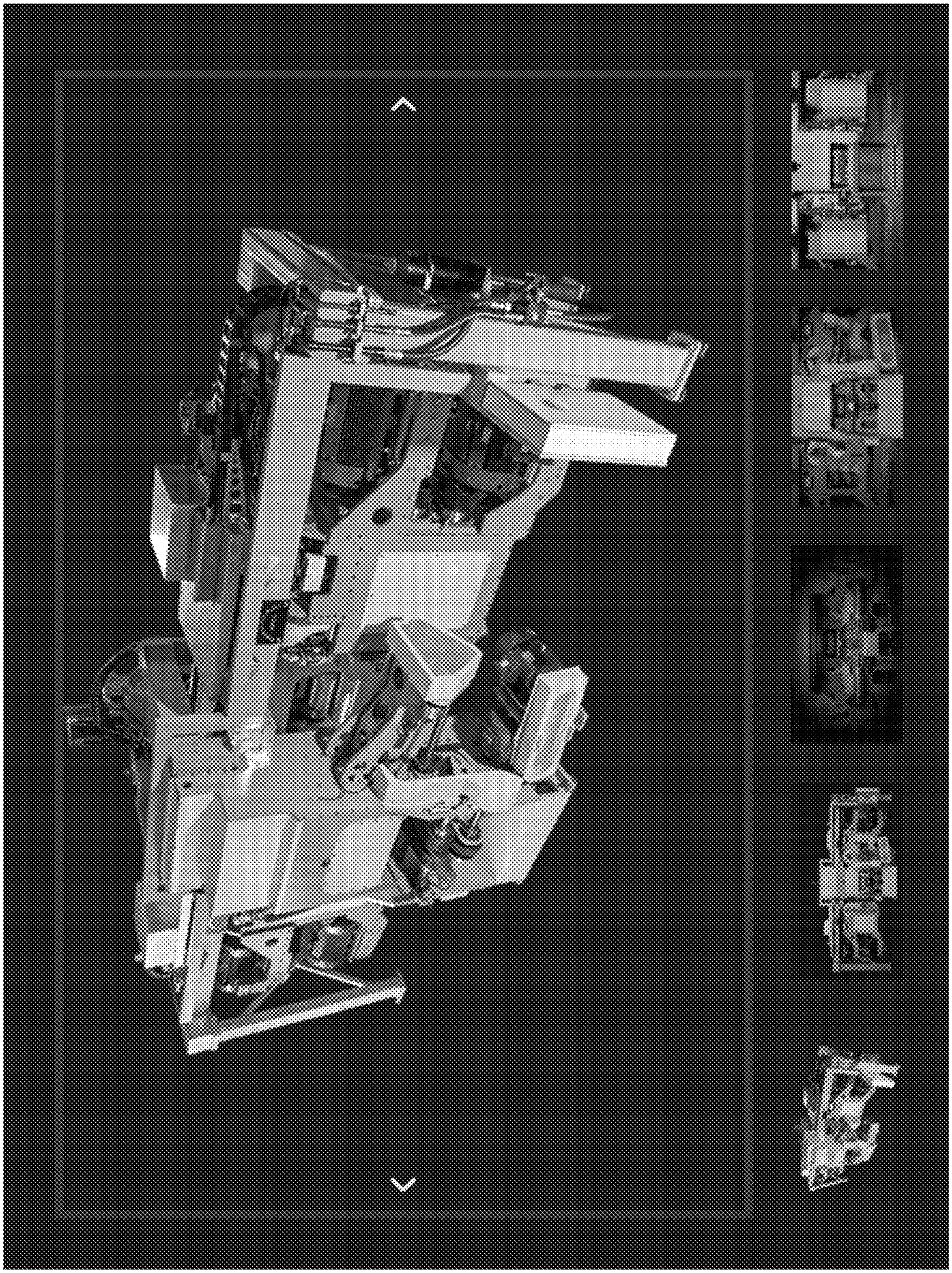
Figure 37:
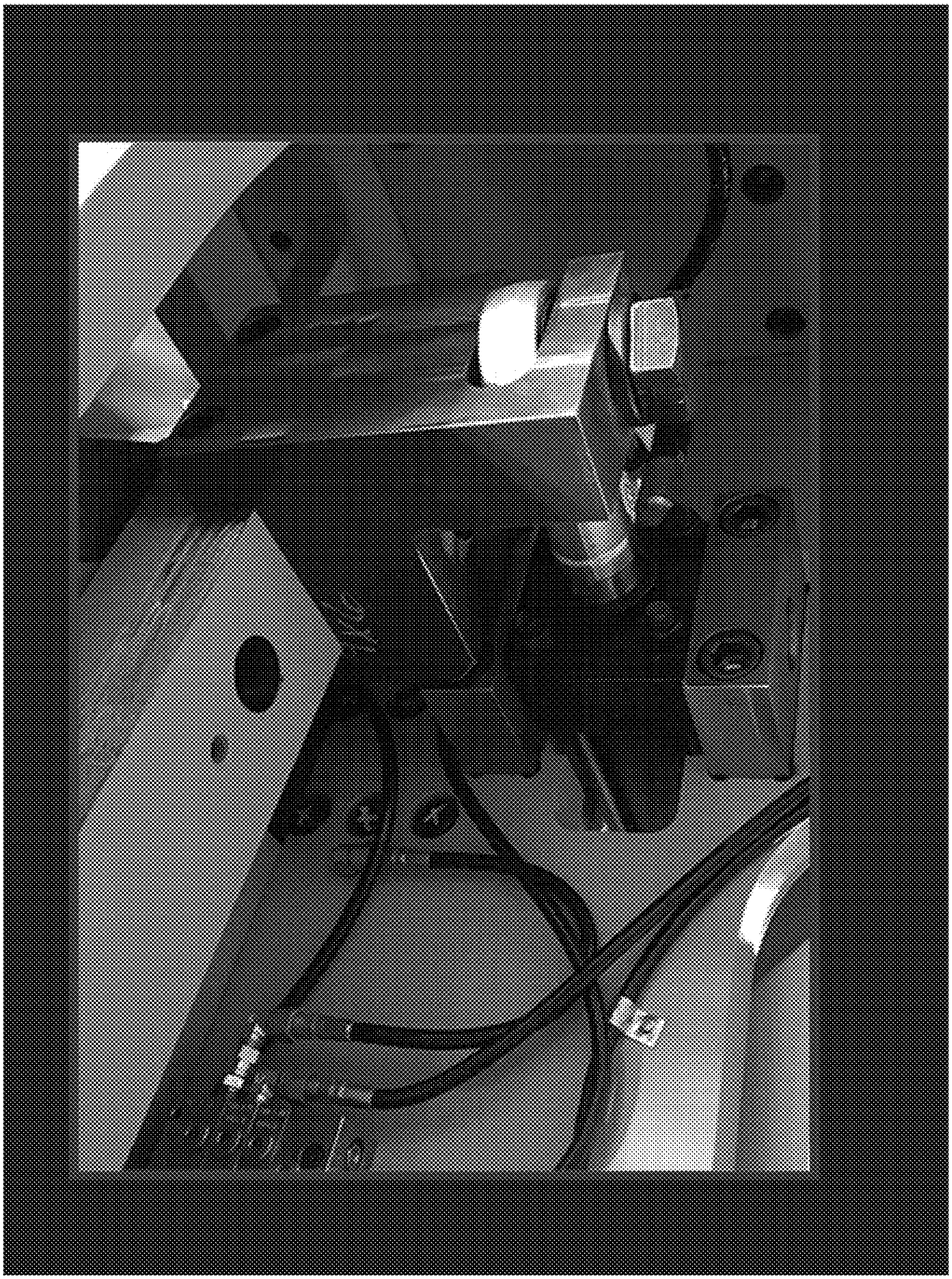
Figure 38:
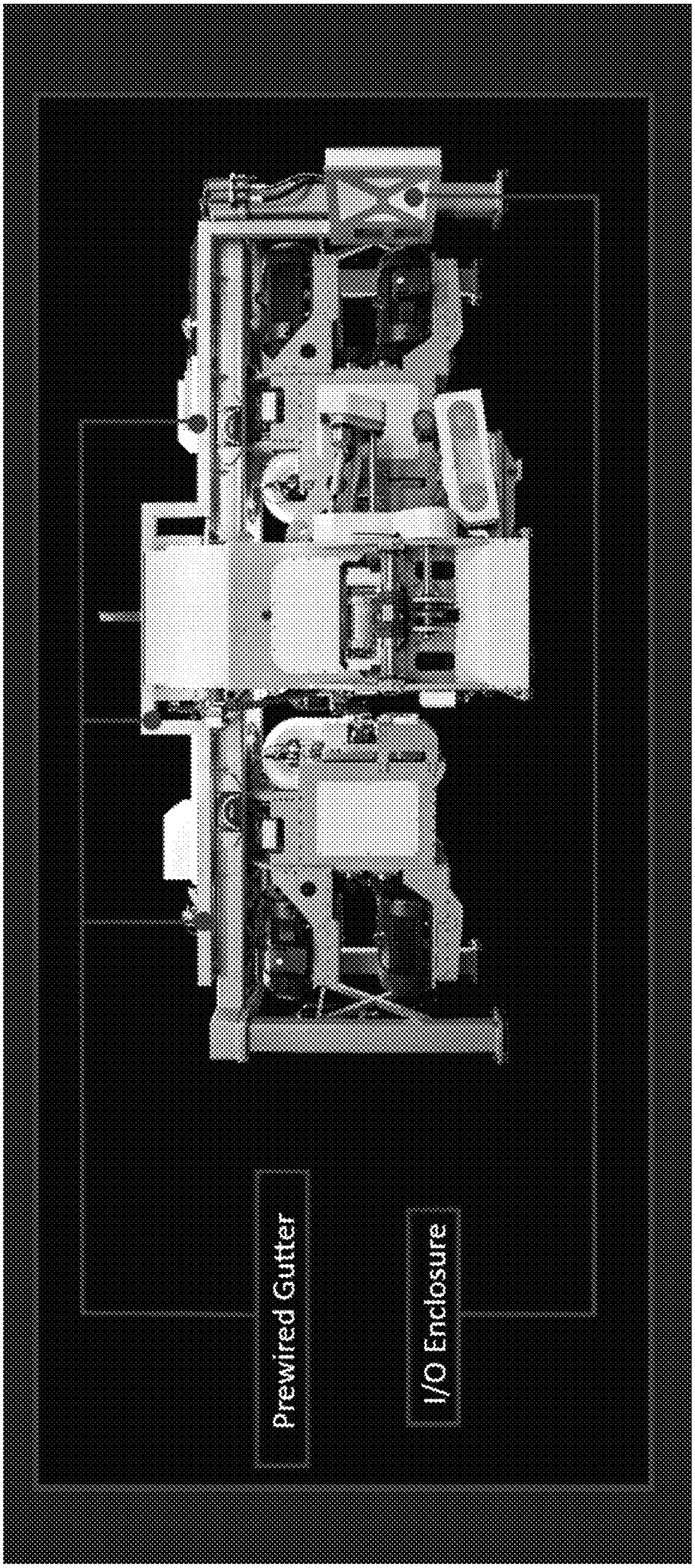
Figure 39:
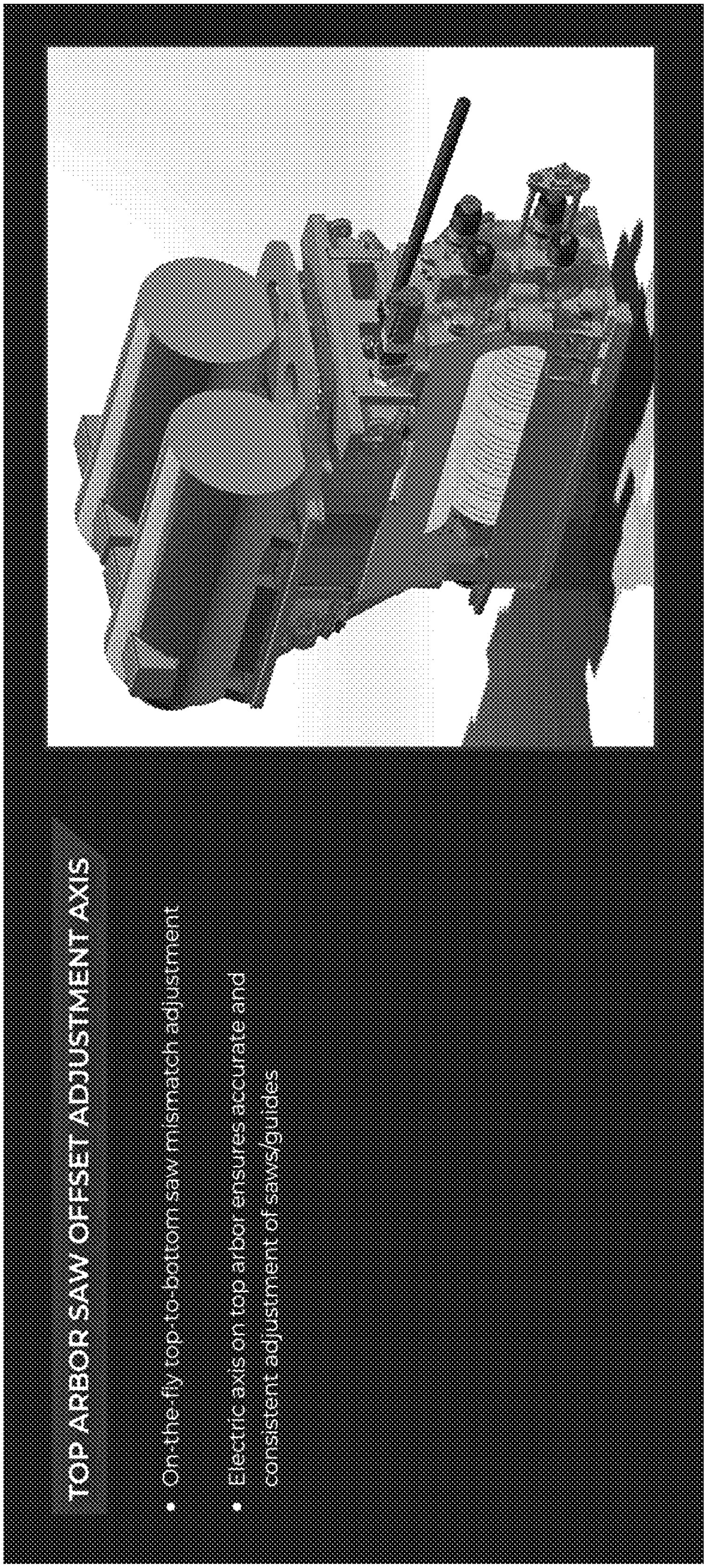
Figure 41:
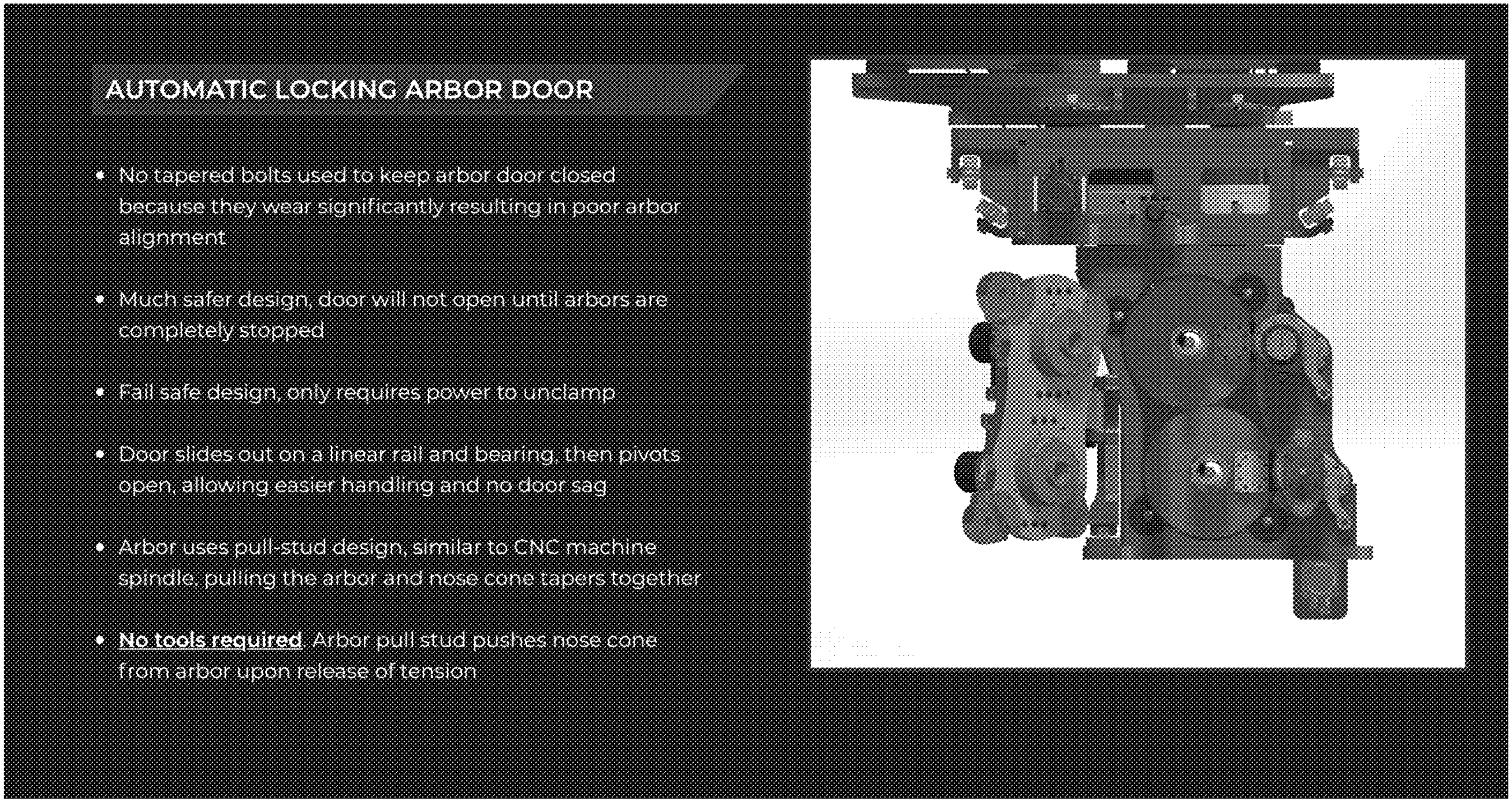
Figure 42:
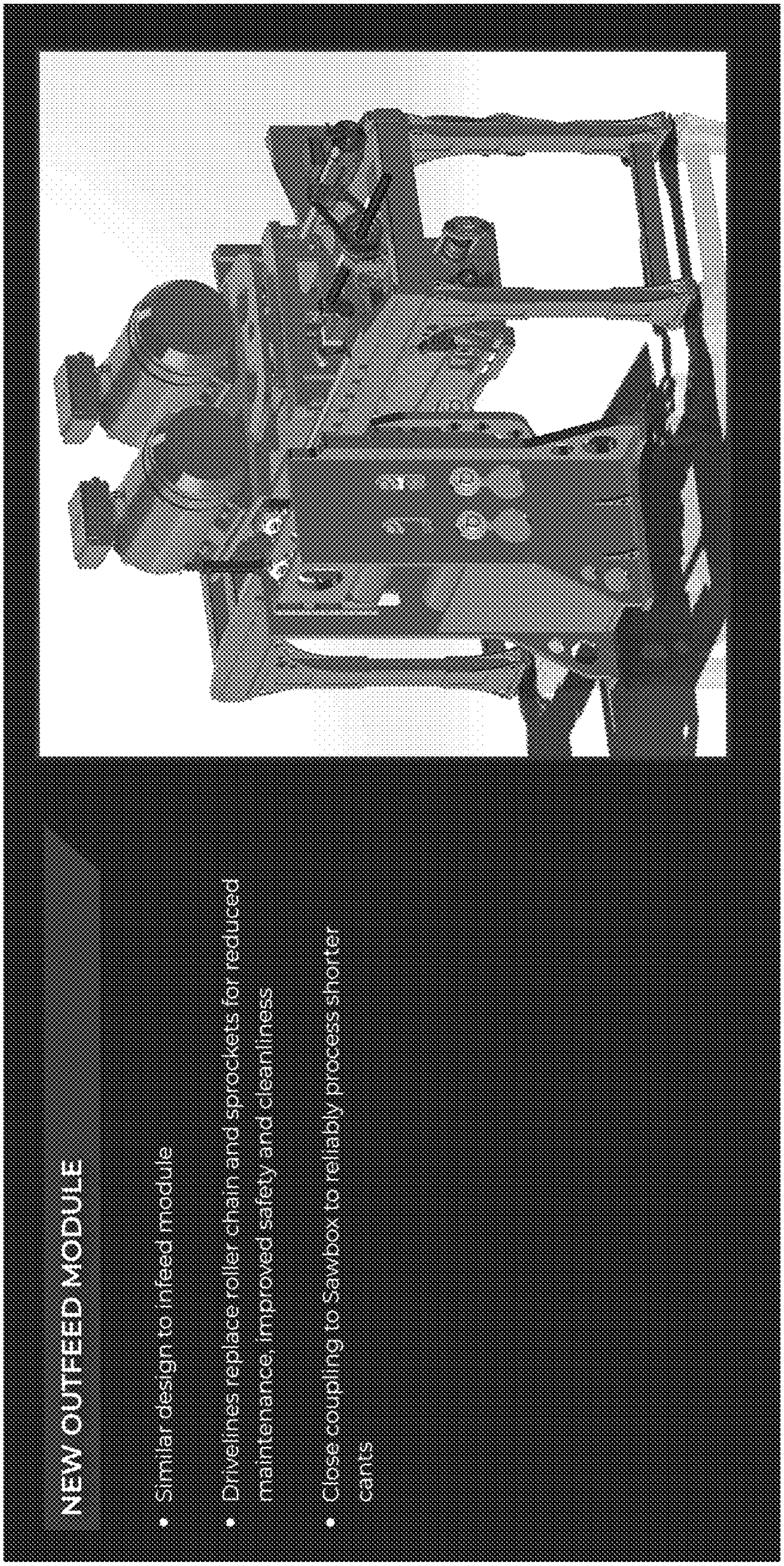
Figure 43:
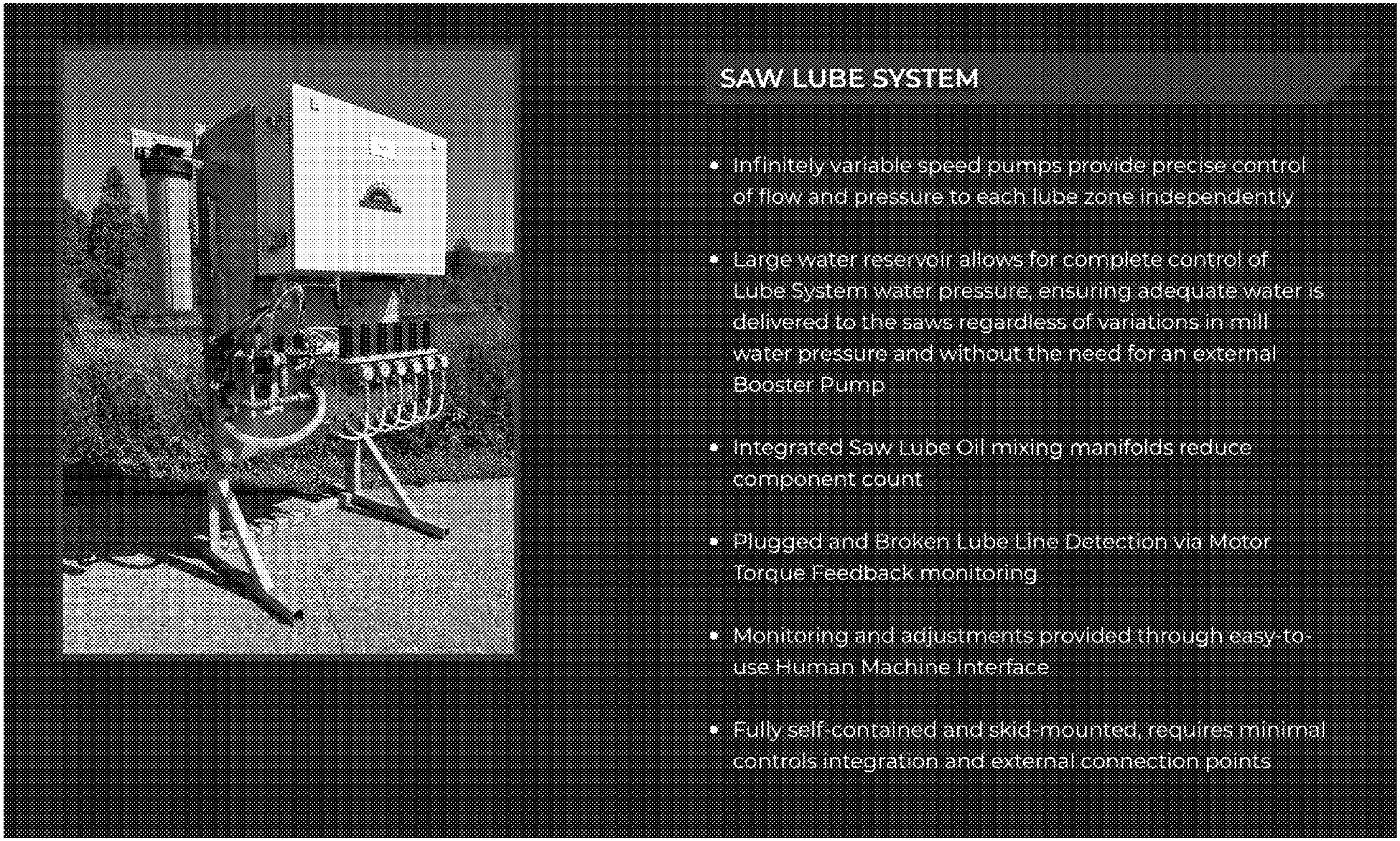

Referring now to FIG. 8 the curve sawing gang saw box has saw guides 43 that hold the saws 28 in predetermined locations to obtain a specific sawn board size. The saw guides 43 are supported by a saw guide shaft 60. The saw guide shaft 60 is mounted to the curve sawing gang saw box 27 by the saw guide clamp arm 61 which is mounted to the curve sawing gang saw box 27 by the saw guide clamp arm 62. On the curve sawing gang door side 64, there is a saw guide shaft rod 63 that is attached to the saw guide shaft 60. The saw guide shaft rod 63 has a threaded end 65 that a saw guide spacer 66 is clamped and attached to, mating the saw guide shaft 60 and the saw guide clamp arm 62. On the curve sawing gang saw box drive 67 side the saw guide spacer 66 is replaced by a hydraulic cylinder 68. Furthermore, attached to the saw guide spacer clamp nut 69 there is an electric actuator 70 that is attached to the curve sawing gang saw box drive side by way of round shaft stand offs 71. The electric actuator 70 positions the saw guide shaft 60 and in turn all the saw guides 43 and saws 28 as well as the curve sawing gang saw box door side 64 saw guide clamp arm 62. When the hydraulic cylinder 68 is actuated only the cylinder body 72 moves. The hydraulic cylinder rod 73 is fixed relative to the position of the electric actuator 70. When the hydraulic cylinder body 72 moves it moves the curve sawing gang saw box drive side 67 saw guide clamp arm 61 moves with it clamping the stack of saw guides 74 concentrically against the curve sawing gang saw box door side 64 saw guide clamp arm 61. The electric actuator 70 can be replaced with a manual adjuster 75. Actuating the hydraulic cylinder 68 in the opposite direction as discussed will result in an unclamping action for saw changes.

The invention encompasses gang saws, gang edger, board edger, canter, chipper, profiler, circular twin, circular quad and many other industry names; as well as straight sawing, curve sawing, slew sawing and all other forms of sawing or chipping logs into lumber. The present invention involves said machinery being mounted above the workpieces (logs) that are being processed into lumber. The workpiece cutting equipment hanging over the top of the workpieces in profiling curve sawing gang application is a machine that is used to cut, chip or saw a cant into lumber.

There are many advantages of the present invention in comparison to conventional machines and processes, including but not limited to the following advantages.

When trees or logs are processed into lumber or boards, the equipment used must be installed on a foundation of some kind, conventionally, below the workpieces. A cant is a log that has been through the first step of breakdown in a sawmill, commonly referred to as the primary breakdown stage. What turns a log into a cant is the process of cutting or chipping two parallel faces onto the log. The profiling curve sawing gang will receive the cant with the parallel faces horizontally orientated. The profiling curve sawing gang can then chip a second pair of parallel faces perpendicular to the first horizontal faces. A profile of a board will then be cut into said second pair of parallel faces, typically one on each face. The profiling curve sawing gang will then use the gang saw portion of the machine with saws rotating about a horizontal axis, to saw the remaining portion of the cant into boards of a predetermined thickness.

Conventionally, all workpiece cutting equipment in the sawmill industry is mounted below the workpiece. There is an extremely large amount of debris that is produced from processing logs into lumber. One of the advantages of the current invention is that such debris does not pile up on the equipment reducing the life of components and increasing cleanup time for the sawmills, and the invention allows the possibility of using superior actuators to position the cutting tools and makes it easier to access the machinery for maintenance.

Conventionally, profiling curve sawing gang machines have two directions of motion. They pivot for the first direction which is angular, and a second direction which is linear and can be perpendicular to the workpiece flow. For the curve sawing gang machine, the pivot point is fixed to the centerline of the workpiece flow. The second direction is only perpendicular to the workpiece flow, if the curve sawing gang pivot is set to zero degrees. The amount the curve sawing gang can pivot is +/−6 degrees. This means that the second direction angle will be +/−6 degrees to workpiece flow. When the curve sawing gang is moving at an angle, the saws that are mounted inside of the curve sawing gang saw box are in fact moving in two directions relative to the workpiece. This makes matching the profiled board shape to the saws more difficult, even though this motion is accounted for in the motion calculation. The present invention makes matching the profiled board shape to the saws easier and more precise.

Another aspect of conventional equipment used to process logs or tress into lumber or boards is the need to change saws and guides. This is done by opening a door that is also the bearing support for the saw arbors. The door is fastened to the saw box wall with tapered bolts that mate to a female taper in the saw box wall to align the door and arbor bearings to the fixed opposing saw box wall. This has multiple downsides including the potential to unsafely open the door while the arbor is still turning due to the manual nature of the operation. Another downside is the time it takes to manually perform this operation. The saw filer changing the saws must get a tool to remove the bolts, typically there are 4 of them. Once all the bolts are removed and placed into a receptacle for safe keeping, the saw filer must then get a pusher bolt and install it into the end of the arbor to push the door open, off the arbor. Saw changes typically happen numerous times throughout the day depending on various sawing conditions. This means a lot of time being spent taking out bolts and putting them back in. These tapered bolts and female receivers are high wear items that when not replaced necessarily will cause arbor misalignment and premature bearing failures as well as poor sawing performance. The present invention avoids these downsides of such conventional equipment.

Conventionally, saw guides locate the saws in predetermined locations to produce an accurate thickness of lumber or boards. Such saw guides are supported by a saw guide shaft which locates the saw guides relative to the arbor axis. There is also a saw guide anti-rotate bar which keep the saw guide in a rotationally acceptable position relative to the saw guide shaft axis. Furthermore, there is a saw guide clamp adjustable, and clamping ends. The saw guide clamp assembly generally consists of a hydraulic clamp cylinder attached to three round shaft pushers spaced equidistant around the guide clamp hydraulic cylinder and guide clamp surface. This has many downsides, mainly in that when the shaft pushers wear, or are not perfectly adjusted, the guides are able to shift, causing poor saw alignment and reduced guide life contributing to poor sawing performance. The present invention avoids these downsides of such conventional equipment.

The invention claimed is:

1. A machine that processes a log, cant, or other wooden workpiece for the purpose of creating lumber comprising:

a feedline for longitudinally conveying the log, cant, or other wooden workpiece;

the feedline comprising an entry feed module and an exit feed module and an opening between the entry feed module and the exit feed module;

the entry feed module and the exit feed module each comprising an upper roller or conveyor and a lower roller or conveyor, whereby the log, cant, or other wooden workpiece is pressed and conveyed in between the upper roller or conveyor and the lower roller or conveyor;

an overhead support structure comprising: a horizontal beam extending over the opening in the feedline between the entry feed module and the exit feed module; two or more vertical legs, supporting the horizontal beam, extending below the feedline, to the left and right of the feedline; an opening in the overhead support structure, below the horizontal beam, between the vertical legs, below the feedline; the entry feed module and the exit feed module configured to longitudinally convey the log, cant, or other wooden workpiece across the opening in the feedline between the entry feed module and the exit feed module and through the overhead support structure over the opening in the overhead support structure;

a linear guide rail mounted to the horizontal beam of the overhead support structure extending over the feedline;

a cutting tool assembly hanging from the linear guide rail;

the cutting tool assembly comprising a vertical axis, an upper arbor, an upper saw rotated by the upper arbor, a lower arbor, and a lower saw rotated by the lower arbor;

the cutting tool assembly configured to traverse the linear guide rail and pivot over the opening in the feedline, about the vertical axis, between the entry feed module and the exit feed module to position the cutting tool assembly to adjust to the geometric shape of the log, cant, or other wooden workpiece being longitudinally conveyed by the feedline; and the cutting tool assembly configured to receive the log, cant, or other wooden workpiece between the upper arbor and the lower arbor and to cut the log, cant, or other wooden workpiece being longitudinally conveyed by the feedline;

whereby falling debris, created from operating the machine falls below the horizontal beam of the overhead support structure extending over the opening in the feedline between the entry feed module and the exit feed module and the cutting tool assembly hanging from the linear guide rail, produced as a byproduct of cutting the log, cant, or other wooden workpiece, falls through, or collects in and is accessible and removable from, an open area comprising the opening in the overhead support structure.

2. The machine of claim 1 where the linear guide rail is perpendicularly oriented relative to the feedline.

3. The machine of claim 1 where the linear guide rail comprises a linear rail and a bearing.

4. The machine of claim 1 where the cutting tool assembly is powered by a motor above the feedline.

5. The machine of claim 1 further comprising an electric actuator above the feedline.

6. The machine of claim 1 where the cutting tool assembly comprises a door.

7. The machine of claim 1 where the cutting tool assembly comprises a door; the door being powered by a hydraulic cylinder.

8. The machine of claim 1 where the saw is a gang saw.

9. The machine of claim 1 where the saw is a curve saw.

10. The machine of claim 1 where the saw is a curve gang saw.

* * * * *